(12) United States Patent
Tanno et al.

(10) Patent No.: US 8,516,991 B2
(45) Date of Patent: Aug. 27, 2013

(54) MULTI-FUEL INTERNAL COMBUSTION ENGINE

(75) Inventors: Shiro Tanno, Toyota (JP); Yasushi Ito, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 484 days.

(21) Appl. No.: 12/989,559

(22) PCT Filed: Apr. 24, 2008

(86) PCT No.: PCT/JP2008/057956
§ 371 (c)(1),
(2), (4) Date: Dec. 27, 2010

(87) PCT Pub. No.: WO2009/130777
PCT Pub. Date: Oct. 29, 2009

(65) Prior Publication Data
US 2011/0088657 A1    Apr. 21, 2011

(51) Int. Cl.
*F02B 5/00*    (2006.01)
*F02M 43/00*   (2006.01)

(52) U.S. Cl.
USPC .......................................... 123/305; 123/304

(58) Field of Classification Search
USPC ................ 73/35.07; 123/1 A, 299, 300, 304, 123/305, 431, 435, 436, 575
See application file for complete search history.

(56) References Cited

U.S. PATENT DOCUMENTS

| | | | |
|---|---|---|---|
| 6,912,992 B2 * | 7/2005 | Ancimer et al. | 123/299 |
| 2002/0162529 A1 * | 11/2002 | Hasegawa | 123/299 |
| 2004/0129245 A1 * | 7/2004 | Hitomi et al. | 123/299 |

FOREIGN PATENT DOCUMENTS

| | | | |
|---|---|---|---|
| JP | 61-145329 | A | 7/1986 |
| JP | 09-068061 | A | 3/1997 |
| JP | 2003-262152 | A | 9/2003 |
| JP | 2004-124887 | A | 4/2004 |
| JP | 2004-197660 | A | 7/2004 |
| JP | 2004-245126 | A | 9/2004 |
| JP | 2005-048692 | A | 2/2005 |
| JP | 2006-283690 | A | 10/2006 |
| JP | 2007-040165 | A | 2/2007 |
| JP | 2007-285174 | A | 11/2007 |
| WO | 03/064838 | A1 | 8/2003 |

* cited by examiner

*Primary Examiner* — Stephen K Cronin
*Assistant Examiner* — Sizo Vilakazi
(74) *Attorney, Agent, or Firm* — Sughrue Mion, PLLC

(57) ABSTRACT

To improve an ignitability to a fuel having a low compressed ignitability in a combustion chamber in a compressed self-ignition diffusive combustion mode operation. In a multi-fuel internal combustion engine operated by introducing at least one type of fuel among at least two types of fuels having different properties into a combustion chamber or introducing a mixed fuel composed of at least the two types of fuels into the combustion chamber, an electronic control unit is provided with a fuel characteristics detection means that detects an ignitability index value as an index showing a compressed ignitability of a fuel itself introduced into the combustion chamber, and a fuel injection control means that previously injects, when a compressed self-ignition diffusive combustion is performed using a fuel in the combustion chamber, which is determined to have a low compressed ignitability based on the ignitability index value, the fuel at a predetermined timing in a period from an intake stroke to a compression stroke, and thereafter mainly injects the fuel and introduces the fuel having the low compressed ignitability into the combustion chamber.

20 Claims, 9 Drawing Sheets

MULTI-FUEL INTERNAL COMBUSTION ENGINE

CROSS REFERENCE TO RELATED APPLICATIONS

This application is a National Stage of International Application No. PCT/JP2009/057956 filed on Apr. 24, 2008.

TECHNICAL FIELD

The present invention relates to a multi-fuel internal combustion engine operated by introducing at least one type of fuel among at least two types of fuels with different properties into a combustion chamber or introducing a mixed fuel composed of at least the two types of fuels into combustion chamber.

BACKGROUND ART

Conventionally, so-called a multi-fuel internal combustion engine operated using plural types of fuels with different properties is known. For example, Patent Document 1 shown below discloses a multi-fuel internal combustion engine configured such that a low octane number fuel is injected into a mixture gas of a high octane number fuel which is injected into an intake air port and the mixture gas of the high octane number fuel is flame propagation combusted using the spontaneous combustion of the low octane number fuel as a starting point and describes that knocking can be prevented by the flame propagation combustion because a time until the combustion is completed can be reduced by increasing a combustion speed. Patent Document 2 shown below discloses a multi-fuel internal combustion engine which can be operated using a fuel selected by a driver from many types of fuels such as gasoline, diesel oil, and ethanol. Further, the Patent Document 2 describes also a multi-fuel internal combustion engine which is operated in a flame ignition mode when an engine load is lower than a predetermined load and is operated in a compressed self-ignition diffusive combustion mode when the engine load is higher than the predetermined load. Further, Patent Document 3 shown below describes a multi-fuel internal combustion engine which is operated using a mixed fuel of gasoline and diesel oil.

Patent Document 1: Japanese Patent Application Laid-open No. 2004-197660
Patent Document 2: Japanese Patent Application Laid-open No. 2004-245126
Patent Document 3: Japanese Patent Application Laid-open No. 9-68061

DISCLOSURE OF INVENTION

Problems to be Solved by the Invention

However, in the multi-fuel internal combustion engine disclosed in the Patent Document 1, since a main combustion is performed by the flame propagation, an effect of preventing knocking is limited. In contrast, as a combustion mode effective to suppress occurrence of knocking, a compressed self-ignition diffusive combustion is known which performs a diffusion combustion by self-igniting a fuel injected into compression air.

When a fuel used to perform the compressed self-ignition diffusive combustion has a low compressed ignitability, since a lower compressed ignitability more increases an ignition delay period (a period of time from a time at which a fuel is injected to a time at which ignition starts), a fast combustion is caused at the time of ignition, and thus an amount of generation of nitrogen oxides (NOx) is increased and a heat efficiency is deteriorated. Accordingly, to avoid the increase of the amount of generation of NOx, and the like, it is sufficient to delay the combustion performed fast, and it is sufficient to delay a fuel injection timing to delay the combustion. However, when the compressed self-ignition diffusive combustion is performed using a fuel having a low compressed ignitability, since an amount of generation of PM and smoke is increased by delaying the fuel injection timing, it is not preferable to delay the fuel injection timing.

Accordingly, an object of the present invention is to improve a disadvantage of the conventional examples and to provide a multi-fuel internal combustion engine capable of improving an ignitability of a fuel having a low compressed ignitability in a combustion chamber in a compressed self-ignition diffusive combustion mode.

Means for Solving Problem

In order to achieve the object, according to one aspect of the present invention, a multi-fuel internal combustion engine operated by introducing at least one type of fuel among at least two types of fuels with different properties into a combustion chamber or introducing a mixed fuel composed of at least the two types of fuels into the combustion chamber, the engine includes a fuel characteristics detection means that detects an ignitability index value as an index showing a compressed ignitability of a fuel itself introduced into the combustion chamber; and a fuel injection control means that previously injects, when a compressed self-ignition diffusive combustion is performed using a fuel in the combustion chamber, which is determined to have a low compressed ignitability based on the ignitability index value, the fuel at predetermined timing in a period from an intake stroke to a compression stroke, and thereafter mainly injects the fuel and introduces the fuel having the low compressed ignitability into the combustion chamber.

In the multi-fuel internal combustion engine, since an in-cylinder temperature and an in-cylinder pressure in a combustion chamber are increased as a previous-injected fuel is combusted, an ignitability to a main-injected fuel in the combustion chamber is improved. Further, in the multi-fuel internal combustion engine, when a main injection is performed at the time flame cores and heat are generated by the ignition of the previous-injected fuel, the ignitability to the main-injected fuel in the combustion chamber is improved. Accordingly, since the multi-fuel internal combustion engine can be operated in a stable compressed self-ignition diffusive combustion mode in which knocking is not caused by an abnormal combustion, a fast combustion does not occur even if a main-injected fuel introduced into the combustion chamber has a low compressed ignitability and thus an increase of an amount of generation of NOx and a deterioration of a heat efficiency can be suppressed. Further, in the multi-fuel internal combustion engine, since diesel knock does not occur in a compressed self-ignition diffusive combustion even if a fuel has a low compressed ignitability, noise and vibration in combustion can be suppressed and further an ignition in the compressed self-ignition diffusive combustion can be stabilized even if the fuel has the low compressed ignitability so that a torque variation caused by a repetition of unstable ignition and combustion is suppressed.

In general, a lower ignitability to a fuel in the combustion chamber takes a longer time until the fuel is self-ignited. Therefore, according to another aspect of the present invention, in the multi-fuel internal combustion engine, when an ignitability to the previous-injected fuel in the combustion chamber is lower, the fuel injection control means previously injects the fuel at an earlier timing in the period from the intake stroke to the compression stroke.

With the configuration, the multi-fuel internal combustion engine is configured such that even if a previous-injected fuel itself has a low compressed ignitability, the previous-injected fuel can be self-ignited until a fuel injection timing of a main-injected fuel is reached.

In order to achieve the object, according to still another aspect of the present invention, in the multi-fuel internal combustion engine, the fuel injection control means more reduces an amount of the previous-injected fuel as an intake air pressure is lower. For example, the fuel injection control means more reduces an upper limit value of the amount of the previous-injected fuel as the intake air pressure is lower.

When the fuel injection amount of the previous-injected fuel is the same, although a lower intake air pressure is more liable to cause a fast combustion, in the multi-fuel internal combustion engine, since the lower intake air pressure more reduces the fuel injection amount of the previous-injected fuel, the fast combustion can be prevented.

In order to achieve the object, according to still another aspect of the present invention, in the multi-fuel internal combustion engine, the fuel injection control means more reduces the amount of the previous-injected fuel as an engine speed is lower. For example, the fuel injection control means more reduces the upper limit value of the amount of the previous-injected fuel as an engine speed is lower.

When the fuel injection amount of the previous-injected fuel is the same, although a lower engine speed is more liable to cause a fast combustion, in the multi-fuel internal combustion engine, since the lower engine speed more reduces the fuel injection amount of the previous-injected fuel, the fast combustion can be prevented.

From a view point of omitting a control of an ignition timing and the like, it is preferable that the previous-injected fuel is self-ignited in the combustion chamber, and, for the purpose, the fuel preferably contains at least a fuel excellent in a compressed ignitability. Therefore, for example, the fuel introduced into the combustion chamber may be a mixed fuel of gasoline and diesel oil.

In order to achieve the object, in the multi-fuel internal combustion engine, the previous-injected fuel is a high flammable fuel, and the fuel injection control means spark-ignites a mixture gas of the previous-injected fuel and thereafter mainly injects the mixture gas.

In the multi-fuel internal combustion engine, the previous-injected fuel is combusted by being ignited by a spark ignition. With the operation, since the in-cylinder temperature and the in-cylinder pressure of the combustion chamber are increased, the ignitability to the main-injected fuel in the combustion chamber is improved. Further, in the multi-fuel internal combustion engine, when the main injection is performed at the time flame cores and the heat are generated by the spark ignition of the previous-injected fuel, the ignitability to the main-injected fuel in the combustion chamber is improved. Accordingly, in the multi-fuel internal combustion engine, the same advantage as that of the multi-fuel internal combustion engine described in claim 1 described above can be achieved.

In order to achieve the object, in the multi-fuel internal combustion engine, when the previous injection is performed, the fuel injection control means advance-angle-controls a fuel injection timing of the main injection.

In the multi-fuel internal combustion engine, since the fast combustion is prevented by the previous injection, generation of PM and smoke in the compressed self-ignition diffusive combustion can be suppressed by advancing the fuel injection timing of the main injection.

Effect of the Invention

When the compressed ignitability of a fuel is low at the time the multi-fuel internal combustion engine according to the present invention is operated in a compressed self-ignition diffusive combustion mode, the previous injection is performed prior to the main injection and an in-cylinder temperature and an in-cylinder pressure are increased making use of the combustion reaction of the previous injection, and the ignitability to a main-injected fuel is increased. Further, in the multi-fuel internal combustion engine, an ignitability to a fuel having a low compressed ignitability is increased by using flame cores and heat generated by the ignition of the main-injected fuel having the low compressed ignitability in the same state. Thus, according to the multi-fuel internal combustion engine, a compressed self-ignition diffusive combustion, in which occurrence of knocking caused by an abnormal combustion can be suppressed, can be performed regardless whether the compressed ignitability of a fuel introduced into a combustion chamber is good or bad. In particular, in the multi-fuel internal combustion engines, the compressed self-ignition diffusive combustion can be performed without causing a fast combustion even if a fuel having a low compressed ignitability is used, an increase of an amount of generation of NOx and a deterioration of heat efficiency can be suppressed. Further, in the multi-fuel internal combustion engine, since an ignition and a combustion are stably performed in the compressed self-ignition diffusive combustion even if the fuel having the low compressed ignitability is used, noise and vibration in combustion and a torque variation can be suppressed. In contrast, in the multi-fuel internal combustion engine, since the compressed self-ignition diffusive combustion can be stably performed even if the compressed ignitability of a mixed fuel is deteriorated, the mixing ratio of a fuel having a high evaporation property can be increased and thus generation of PM and smoke in the compressed self-ignition diffusive combustion can be suppressed. As described above, according to the multi-fuel internal combustion engines of the present invention, an operation can be performed in the stable compressed self-ignition diffusive combustion mode so that an emission performance and an output performance can be improved as well as a fuel consumption performance can be improved.

EXPLANATION OF LETTERS OF NUMERALS

Figure 1:
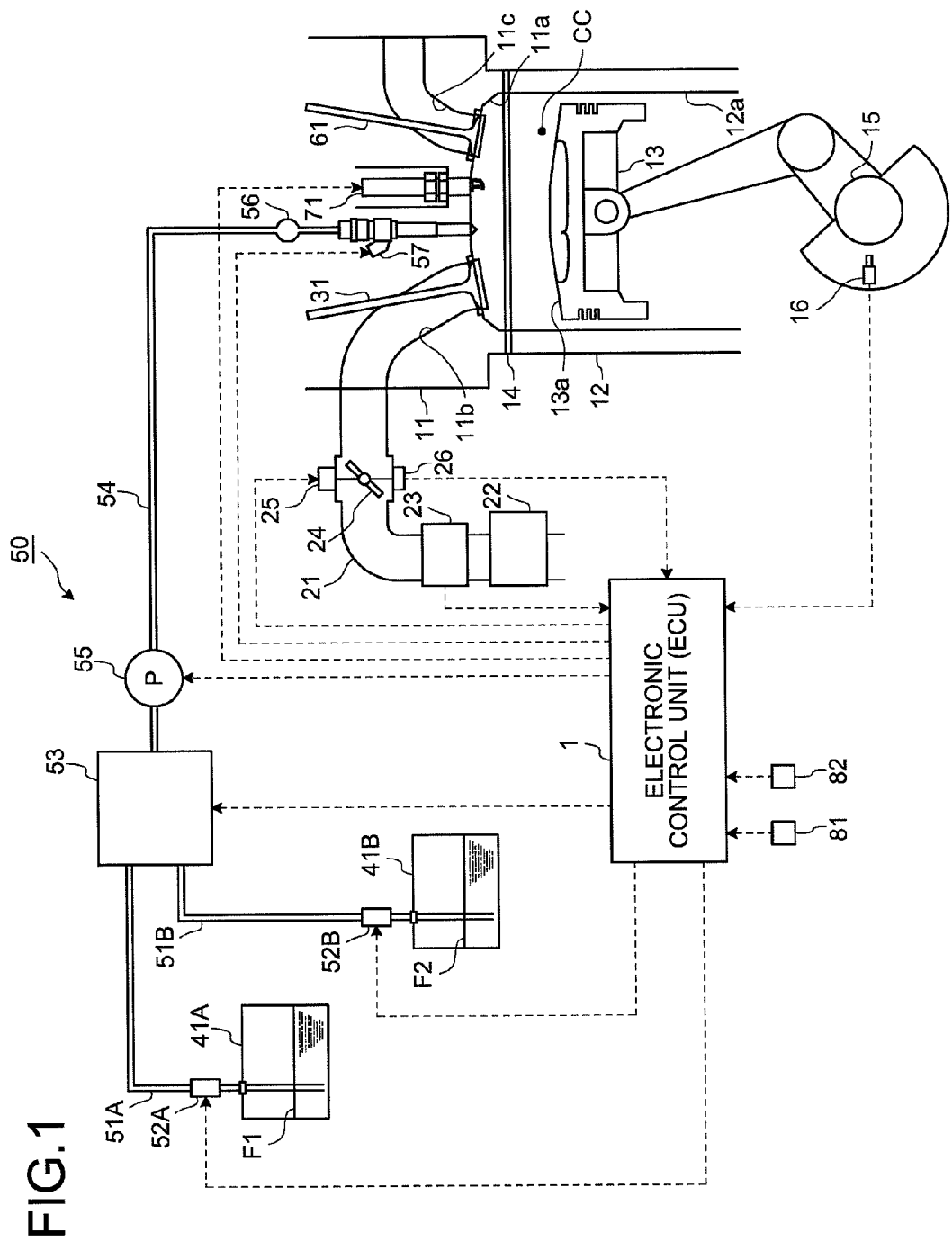
FIG. 1 is a view showing a configuration of a first embodiment of a multi-fuel internal combustion engine according to the present invention.

1 Electronic control unit
16 Crank angle sensor
23 Air flow meter
41A First fuel tank
41B Second fuel tank
50, 150, 250 Fuel supply unit
57, 157, 257A, 257B Fuel injection valve
81 Water temperature sensor
82 Intake air temperature sensor
83 In-cylinder pressure sensor
CC Combustion chamber
F1 First fuel
F2 Second fuel
FM Main injection amount
FP, FPc, FPs Previous injection amount
FPc1, FPs1 Reference previous injection amount
FPc2, FPs2 Previous injection amount upper limit guard value
I, IP, IM Ignitability index value
Is1 First ignitability determination reference value
Is2 Second ignitability determination reference value
Kl Engine load
Ne Engine speed
Pin Intake air pressure
Pr Maximum in-cylinder pressure increase ratio
Pr0 Combustion state determination reference value
ta Intake air temperature
tw Water temperature
TM Main injection timing
TP, TPc, TPs Previous injection timing

BEST MODE(S) FOR CARRYING OUT THE INVENTION

Embodiments of a multi-fuel internal combustion engine according to the present invention will be explained below in detail based on drawings. Note that the present invention is by no means limited by the embodiments.

First Embodiment

A first embodiment of the multi-fuel internal combustion engine according to the present invention will be explained based on FIG. 1 to FIG. 7. The multi-fuel internal combustion engine is an internal combustion engine operated by introducing at least one type of fuel among at least two types of fuels with different properties into a combustion chamber or an internal combustion engine operated by introducing a mixed fuel composed of at least the two types of fuels into a combustion chamber. In the first embodiment, the latter multi-fuel internal combustion engine will be explained as an example.

In the multi-fuel internal combustion engine, various control operations such as a combustion control are performed by an electronic control unit (ECU) 1 shown in FIG. 1. The electronic control unit 1 is composed of a not shown central processing unit (CPU), a Read Only Memory (ROM) for previously storing a predetermined control program and the like, a Random Access Memory (RAM) for temporarily storing a result of calculation of the CPU, a backup RAM for storing previously prepared information and the like.

First, a configuration of the multi-fuel internal combustion engine exemplified here will be explained based on FIG. 1. Note that although only one cylinder is shown in FIG. 1, the present invention is not limited thereto and can be applied also to a multi-cylinder multi-fuel internal combustion engine. The first embodiment will be explained assuming that plural cylinders are provided.

The multi-fuel internal combustion engine includes a cylinder head 11, a cylinder block 12, and a piston 13 for forming a combustion chamber CC. The cylinder head 11 is tightened to the cylinder block 12 by bolts and the like via a head gasket 14 shown in FIG. 1, and the piston 13 is reciprocatingly movably disposed in a space between a concave portion 11a of a lower surface of the cylinder head 11 and a cylinder bore 12a of the cylinder block 12 formed by the configuration described above. The combustion chamber CC described above is composed of a space surrounded by a wall surface of the concave portion 11a of the cylinder head 11, a wall surface of the cylinder bore 12a, and an apex surface 13a of the piston 13.

The multi-fuel internal combustion engine of the first embodiment supplies air and a fuel into the combustion chamber CC according to an operating condition such as an engine speed, an engine load, and the like and a combustion mode and performs a combustion control according to the operating condition and the like. The air is sucked from the outside via an intake air path 21 and an intake air port 11b of the cylinder head 11 shown in FIG. 1. In contrast, the fuel is supplied using a fuel supply unit 50 shown in FIG. 1.

First, an air supply path will be explained. An air cleaner 22 for removing foreign substances such as dusts and the like contained in the air introduced from the outside and an air flow meter 23 for detecting an amount of air sucked from the outside are disposed on the intake air path 21 of the first embodiment. In the multi-fuel internal combustion engine, a signal detected by the air flow meter 23 is sent to the electronic control unit 1, and the electronic control unit 1 calculates an intake air amount, an engine load, and the like based on the detected signal.

Further, a throttle valve 24 for adjusting the intake air amount into the combustion chamber CC and a throttle valve actuator 25 for opening and closing the throttle valve 24 are disposed downstream of the air flow meter 23 on the intake air path 21. The electronic control unit 1 of the first embodiment drives and controls the throttle valve actuator 25 according to the operating condition and the combustion mode and adjusts a valve opening angle of the throttle valve 24 so that the valve opening angle is set an angle (in other words, an intake air amount) according to the operating condition and the like. For example, the throttle valve 24 is adjusted so that the intake air amount of air, which is necessary to achieve an air/fuel ratio according to the operating condition and the combustion mode, is sucked into the combustion chamber CC. The multi-fuel internal combustion engine is provided with a throttle opening degree sensor 26 for detecting a valve opening degree of the throttle valve 24 and transmitting the detected signal to the electronic control unit 1.

Further, the intake air port 11*b* has one end which opens to the combustion chamber CC, and an intake air valve 31 is disposed to the opening portion to open and close the opening. The number of the opening may be one or plural, and the intake air valve 31 is disposed to each of the openings. Accordingly, in the multi-fuel internal combustion engine, air is sucked from the intake air port 11*b* into the combustion chamber CC by opening the intake air valve 31, whereas a flow of air into the combustion chamber CC is shut off by closing the intake air valve 31.

As the intake air valve 31, there is a valve which is opened and closed by, for example, rotation of a not shown intake air side cam shaft and elastic force of an elastic member (helical spring). This type of the intake air valve 31 is opened and closed at a preset open/close timing by causing a suction side cam shaft to associate with rotation of a crank shaft 15 by interposing a power transmission mechanism composed of a chain, a sprocket and the like between the suction side cam shaft and the crank shaft 15. The intake air valve 31, which is opened and closed in synchronization with rotation of the crank shaft 15, is applied to the multi-fuel internal combustion engine of the first embodiment.

However, the multi-fuel internal combustion engine may be provided with a variable valve mechanism such as a so-called variable valve timing & lift mechanism and the like which can change the open/close timings and a lift amount of the intake air valve 31. With this configuration, the open/close timing and the lift amount of the intake air valve 31 can be changed to a preferable open/close timing and a preferable lift amount according to the operation condition and the combustion mode. Further, the multi-fuel internal combustion engine may use a so-called electromagnetic drive valve which opens and closes the intake air valve 31 making use of an electromagnetic force to obtain the same operation/working effect as that of the variable valve mechanism.

Subsequently, the fuel supply unit 50 will be explained. The fuel supply unit 50 introduces plural types of fuels with different properties into the combustion chamber CC. The first embodiment will exemplify a fuel supply unit configured such that two types of fuels with different properties (a first fuel F1 stored in a first fuel tank 41A and a second fuel F2 stored in a second fuel tank 41B) are previously mixed at a predetermined fuel mixing ratio and the mixed fuel is directly injected into the combustion chamber CC.

Specifically, the fuel supply unit 50 includes a first feed pump 52A for sucking the first fuel F1 from the first fuel tank 41A and feeding the first fuel F1 to a first fuel path 51A, a second feed pump 52B for sucking the second fuel F2 from the second fuel tank 41B and feeding the second fuel F2 to a second fuel path 51B, a fuel mixing means 53 for mixing the first and second fuels F1, F2 fed from the first and second fuel paths 51A, 51B, respectively, a high pressure fuel pump 55 for pressurizing the mixed fuel prepared by the fuel mixing means 53 and feeding the mixed fuel to a high pressure fuel path 54 under pressure, a delivery path 56 for distributing the mixed fuel in the high pressure fuel path 54 to respective cylinders, and fuel injection valves 57 of the respective cylinders for injecting the mixed fuel fed from the delivery path 56 into the combustion chamber CC.

In the fuel supply unit 50, the first feed pump 52A, the second feed pump 52B, and the fuel mixing means 53 are driven and controlled by a fuel mixing control means of the electronic control unit 1 so that a mixed fuel mixed at a predetermined fuel mixing ratio is prepared by the fuel mixing means 53. For example, the fuel supply unit 50 may adjust the fuel mixing ratio of the mixed fuel by causing the fuel mixing control means of the electronic control unit 1 to adjust the injection amounts of the first feed pump 52A and the second feed pump 52B, respectively. Further, the fuel supply unit 50 may adjust the fuel mixing ratio of the mixed fuel by causing the fuel mixing means 53 to adjust the respective mixing ratios of the first and second fuels F1, F2 in response to an instruction of the fuel mixing control means. The fuel mixing ratio may be a preset fixed value and may be a variable value that varies according to the operating condition and the combustion mode.

Further, the fuel supply unit 50 is configured such that the high pressure fuel pump 55 and the fuel injection valves 57 are driven and controlled by a fuel injection control means of the electronic control unit 1 so that the prepared mixed fuel is injected under a fuel injection condition of a fuel injection amount, a fuel injection timing, a fuel injection period, and the like that are desired. For example, the fuel injection control means of the electronic control unit 1 causes the high pressure fuel pump 55 to feed the mixed fuel under pressure therefrom and causes the fuel injection valves 57 to inject the mixed fuel under the fuel injection condition according to the operating condition, the combustion mode, and the like.

The mixed fuel supplied to the combustion chamber CC as described above is combusted by an ignition operation in an ignition mode corresponding to the combustion mode together with the air described above. Then, after the mixed fuel is combusted, an in-cylinder gas is discharged to an exhaust port 11*c* shown in FIG. 1 from the combustion chamber CC. An exhaust valve 61 for opening/closing an opening between the exhaust port 11*c* and the combustion chamber CC is disposed to the exhaust port 11*c*. The number of the opening may be one or plural, and the exhaust valve 61 is disposed to each of the openings. Accordingly, in the multi-fuel internal combustion engine, the in-cylinder gas after combustion is discharged from the combustion chamber CC into the exhaust port 11*c* by opening the exhaust valve 61, and discharge of the in-cylinder gas into the exhaust port 11*c* is shut off by closing the exhaust valve 61.

Likewise the intake air valve 31 described above, a valve to which a power transmission mechanism is interposed, a valve provided with a variable valve mechanism such as a so-called variable valve timing & lift mechanism and the like, and a so-called electromagnetic drive valve can be applied as the exhaust valve 61.

Incidentally, in an internal combustion engine, in general, the combustion mode is roughly classified to a diffusion combustion mode and a flame propagation combustion mode, and a compression self-ignition mode and a premixed flame ignition mode are prepared as ignition modes corresponding to the diffusion combustion mode and the flame propagation combustion mode, respectively. In the following description, these modes are generically called the combustion mode and called a compressed self-ignition diffusive combustion mode and a premixed spark ignition flame propagation combustion mode, respectively.

First, the compressed self-ignition diffusive combustion mode is a combustion mode in which a high pressure fuel is injected into a high temperature compressed air formed in the combustion chamber CC in a compression stroke to thereby self-ignite a part of the fuel, and combustion is progressed while diffusing and mixing the fuel and the air. Since the compressed air and the fuel in the combustion chamber CC are unlike to be instantly mixed with each other, an air/fuel ratio is dispersed partially just after the fuel starts to be injected. In contrast, when the fuel is diffusion-combusted, it is ordinarily preferable to use a fuel excellent in a compression igniting property as described below, and the fuel excellent in the compression igniting property is self-ignited in a portion of an air/fuel ratio suitable for combustion without waiting that the fuel has been entirely injected. Accordingly, in the compressed self-ignition diffusive combustion mode, the fuel of the portion of the air/fuel ratio suitable for combustion is self-ignited first, and a flame formed by the self-ignition gradually progresses a combustion while involving the remaining fuel and air. Since an abnormal combustion does not occur in the compressed self-ignition diffusive combustion, so-called knocking ordinarily referred to in a gasoline engine does not occur. Accordingly, to increase torque and an output in a high load region, it is preferable to perform an operation in the compressed self-ignition diffusive combustion mode which is not restricted by knocking.

To perform an operation in the compressed self-ignition diffusive combustion mode, a fuel whose ignition point is ordinarily lower than compression heat of compressed air and which has an excellent compression igniting property. For example, diesel oil, dimethyl ether, and the like are contemplated as the fuel excellent in the compression igniting property. Further, recently, attention is paid to Gas To Liquids (GTL) as an alternative fuel of diesel oil, and the GTL fuel can be easily prepared as a fuel having a desired property. Accordingly, the GTL fuel, which is prepared to increase the compression igniting property, can be also used to the fuel excellent in the compression igniting property. The fuel, which is excellent in the compression igniting property, not only permits the compressed self-ignition diffusive combustion but also reduces an amount of generation of NOx when the operation is performed in the compressed self-ignition diffusive combustion mode and further can suppress noise and vibration in combustion.

In contrast, the premixed spark ignition flame propagation combustion mode is a combustion mode in which a fire lighting source is given to a pre-mixture gas in the combustion chamber CC, which is prepared by previously mixing a fuel and air, by a spark ignition, and a combustion is caused to progress while propagating a flame about the fire lighting source. The premixed spark ignition flame propagation combustion mode includes combustion modes such as a homogeneous combustion mode in which a homogeneously pre-mixture gas is ignited, a stratified combustion mode in which a rich pre-mixture gas is formed in the periphery of an ignition means as well as a lean pre-mixture gas is formed in the periphery of the rich pre-mixture gas and the rich pre-mixture gas is ignited, and the like.

A fuel excellent in an evaporation property represented by gasoline is ordinarily contemplated as a fuel suitable for the premixed spark ignition flame propagation combustion mode. Since the fuel excellent in the evaporation property is easily mixed with air, the fuel contributes to suppress PM, smoke, NOx, and uncombusted hydrocarbon (uncombusted HC) by reducing an excessively rich region of a fuel. In addition to the gasoline, a GTL fuel prepared as a fuel having an excellent evaporation property, alcohol fuel such as dimethyl ether are known as the fuel excellent in the evaporation property.

The multi-fuel internal combustion engine of the first embodiment is configured such that the multi-fuel internal combustion engine can be operated in both the combustion modes. Accordingly, to permit the multi-fuel internal combustion engine of the first embodiment to be operated in the premixed spark ignition flame propagation combustion mode, an ignition plug 71 shown in FIG. 1 is disposed to the multi-fuel internal combustion engine to ignite a pre-mixture gas by a spark. The ignition plug 71 executes a spark ignition in response to an instruction of the electronic control unit 1 when ignition timing according to an operating condition in the premixed spark ignition flame propagation combustion mode is reached.

Figure 2:
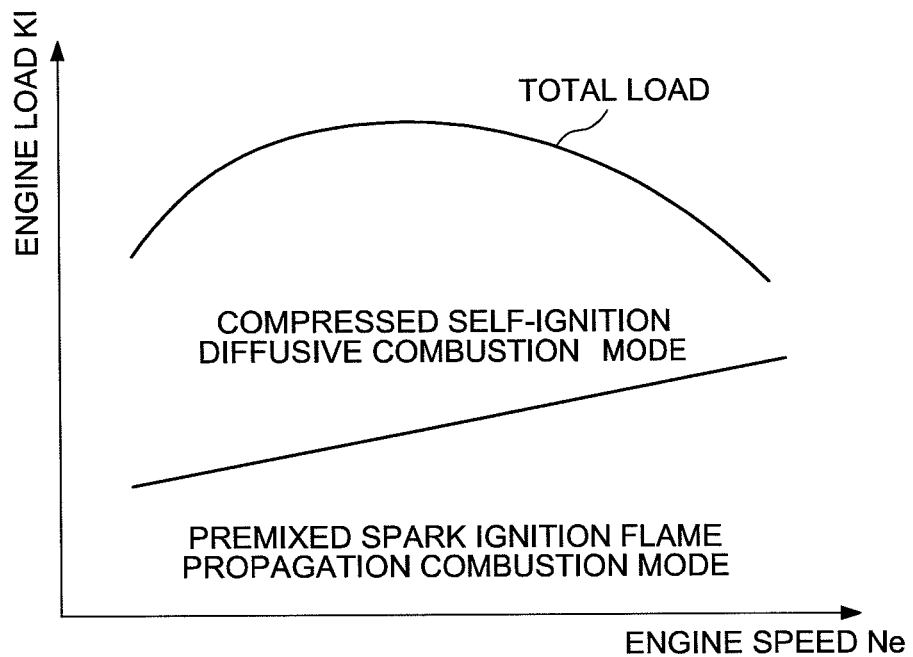
FIG. 2 is a view showing an example of combustion mode map data used when a combustion mode is set.

Further, a combustion mode set means for setting a combustion mode is prepared to the electronic control unit 1 of the first embodiment. The combustion mode set means exemplified here is caused to select an optimum combustion mode according to an operating condition making use of combustion mode map data, which uses the operating condition (engine speed Ne and an engine load Kl) as a parameter, as shown in FIG. 2. For example, the combustion mode map data is previously set based on an experiment and a simulation so that an operation is performed in the compressed self-ignition diffusive combustion mode in an operating condition of a medium/high load-low revolution, a high load-high revolution, and the like and is performed in the premixed spark ignition flame propagation combustion mode in an operating condition of a low load-low revolution, a low/medium load-high revolution, and the like. The engine speed Ne can be obtained from a signal detected by a crank angle sensor 16 shown in FIG. 1. The crank angle sensor 16 is a sensor for detecting a revolution angle of the crank shaft 15. In contrast, the engine load Kl can be obtained from a signal detected by the air flow meter 23 described above.

In the compressed self-ignition diffusive combustion mode, since a fuel is injected into compressed air, when a fuel having a low evaporation property is used, the mixed state of the fuel and air is unlike to be made uniform, and further since a temperature and a pressure in the combustion chamber CC are lowered during a diffusion combustion period and a post-combustion period, PM and smoke are liable to be generated due to occurrence of an imperfect combustion. In particular, a lower evaporation property of the fuel more increases the amount of generation of the PM and the smoke. Accordingly, when an operation is performed in the compressed self-ignition diffusive combustion mode, it is sufficient to use a fuel having not only a high compression igniting property but also a high evaporation property. As a result, since the evaporation property of the fuel introduced into the combustion chamber CC is improved and the mixing of the fuel with air is accelerated, an excessively rich region of the fuel is reduced so that the amount of generation of PM and smoke can be reduced.

When a mode, in which the mixed fuel of the respective fuels F1, F2 mixed by the fuel mixing means 53 is fed into the combustion chamber CC as in the multi-fuel internal combustion engine of the first embodiment, is employed, "the fuel introduced into the combustion chamber CC" shown here means the mixed fuel. Exemplified here is a case in which a fuel having a high compression igniting property and a low evaporation property (first fuel F1) is stored in the first fuel tank 41A, and a fuel having a low compression igniting property and a high evaporation property (second fuel F2) is stored in the second fuel tank 41B. For example, diesel oil is stored as the first fuel F1, and gasoline is stored as the second fuel F2. In the case, the various fuel characteristics of the respective fuels F1, F2 must be integrally taken into consideration. However, in general, when the first fuel F1 is mixed at a higher fuel mixing ratio, the fuel introduced into the combustion chamber CC has fuel characteristics having an excellent compression igniting property and an inferior evaporation property, whereas when the second fuel F2 is mixed at a higher fuel mixing ratio, the fuel introduced into the combustion chamber CC has fuel characteristics having an inferior compression igniting property and an excellent evaporation property. Note that when a mode, in which the respective fuels F1, F2 are individually supplied into the combustion chamber CC as in a multi-fuel internal combustion engine shown in FIG. 11 to be described later, is employed, the respective supplied fuels F1, F2 are called "the fuel introduced into the combustion chamber CC" in their entirety. In the case, a larger supply ratio of the first fuel F1 results in fuel characteristics having an excellent compression igniting property and an inferior evaporation property, whereas a larger supply ratio of the second fuel F2 results in fuel characteristics having an inferior compression igniting property and an excellent evaporation property.

As described above, the fuel characteristics of a fuel introduced into the combustion chamber CC depend on the ratios of respective fuels F1, F2 occupied in the fuel, and an increase of the amount of the second fuel F2 excellent in the evaporation property suppresses generation of PM and smoke in the compressed self-ignition diffusive combustion. In contrast, since the compression igniting property of the fuel introduced into the combustion chamber CC is lowered, there is possibility that a self-ignition cannot be performed depending on a degree of increase of the amount of the fuel. Further, even if a self-ignition impossible state is not caused by the fuel having the inferior compression igniting property, since the fuel is combusted fast in the compressed self-ignition diffusive combustion as described above, the amount of generation of NOx is increased and a heat efficiency is deteriorated. Further, when the compressed self-ignition diffusive combustion is performed using the fuel having the inferior compression igniting property, so-called diesel knock is caused and noise and vibration are deteriorated in combustion, and further since torque is violently varied due to an unstable ignition, a stable engine operation becomes impossible.

Recently, a technology for suppressing emission of PM and smoke into the atmosphere by a Diesel Particulate Filter (DPF) as a PM collection device has progressed. Accordingly, when the PM collection device is mounted on a vehicle, even if the compression igniting property of a fuel introduced into the combustion chamber CC is improved by increasing the amount of the first fuel F1 having the high compression igniting property, emission of PM and smoke into the atmosphere can be suppressed. Since the fuel having the high compression igniting property can be used here by the PM collection device when the compressed self-ignition diffusive combustion is performed, an increase of the amount of generation of NOx and noise and the like in combustion, which may be caused when the fuel having the low compression igniting property is used, can be improved.

However, in the multi-fuel internal combustion engine, a fuel mixing ratio (that is, fuel characteristics of a fuel introduced into the combustion chamber CC) is greatly affected thereafter depending on any of the combustion modes is selected and further on any fuel mixing ratio is applied in the selected combustion mode. When, for example, the compressed self-ignition diffusive combustion mode is used often using a mixed fuel in which the first fuel F1 having the high compression igniting property occupies a high mixing ratio, there is a high possibility that the first fuel F1 has been exhausted while remaining the second fuel F2 having the high evaporation property in the second fuel tank 41B. Accordingly, when it is desired to further continue an operation in the compressed self-ignition diffusive combustion mode, it is necessary, for example, to reduce the compression igniting property of a fuel introduced into the combustion chamber CC by suppressing the amount of use of the first fuel F1 by reducing the mixing ratio of the first fuel F1 from a certain timing. As described above, in the multi-fuel internal combustion engine, a fuel having an excellent compression igniting property suitable for the compression self-ignition diffusion at the time cannot be necessarily introduced into the combustion chamber CC.

In contrast, even if the compressed ignitability of the fuel itself as described above cannot be improved, the ignitability of a fuel introduced into the combustion chamber CC can be improved. For example, the ignitability of the fuel in the combustion chamber CC can be improved by increasing an in-cylinder temperature and an in-cylinder pressure. To increase the in-cylinder temperature and the in-cylinder pressure, it is sufficient to perform a preliminary fuel injection (hereinafter, called "previous injection") before an ordinary fuel injection (hereinafter, called "main injection") is performed and to combust a previous-injected fuel in the combustion chamber CC before the main injection is performed. In the following description, a fuel injection mode in which only the main injection is performed is called an ordinary fuel injection mode, and an injection mode in which the previous injection and the main injection are performed is called a composite fuel injection mode.

Thus, in the multi-fuel internal combustion engine of the first embodiment, when an operation is performed in the compressed self-ignition diffusive combustion mode, the fuel injection modes are switched depending on the ignitability to the fuel in the combustion chamber CC.

Whether the ignitability to the fuel in the combustion chamber CC is good or bad changes not only depending on whether the compressed ignitability of the fuel itself is good or bad but also depending on whether a water temperature tw and an intake air temperature ta are high or low. For example, even if a fuel introduced into the combustion chamber CC has a certain degree of a good compressed ignitability, when the water temperature tw and the intake air temperature ta are lower than predetermined temperatures, the ignitability to the fuel becomes bad. As described above, a lower compressed ignitability of the fuel itself and a lower water temperature tw and a lower intake air temperature ta make the ignitability to the fuel in the combustion chamber CC worse. Accordingly, when fuel injection modes are switched in the compressed self-ignition diffusive combustion mode operation, it is necessary to determine the ignitability to the fuel by integrally taking the compressed ignitability of the fuel introduced into the combustion chamber CC, the water temperature tw, and the intake air temperature ta into consideration.

Whether or not the compressed ignitability of a fuel is good or bad can be shown using an index value (hereinafter, called "ignitability index value") I. Accordingly, the electronic control unit 1 of the first embodiment is provided with a fuel characteristics detection means for detecting the ignitability index value I of the fuel. Specifically, a cetane number (cetane index) of a fuel and an ignition delay period in the compressed self-ignition diffusive combustion mode operation can be used as the ignitability index value I of the fuel.

The cetane number of a fuel can be found from, for example, the properties of the respective fuels F1, F2 fuel recognized by the fuel characteristics detection means. However, in the first embodiment, since the respective fuels F1, F2 are fed into the combustion chamber CC after the fuels F1, F2 are mixed by the fuel mixing means 53 at a predetermined fuel mixing ratio, a correct cetane number of the fuels (mixed fuel) introduced into the combustion chamber CC cannot be found unless the fuel mixing ratio of the fuels is also taken into consideration. Accordingly, when the cetane number of the fuels (the mixed fuel) introduced into the combustion chamber CC are used as the ignitability index value I, the cetane number is calculated based on the cetane numbers of the respective fuels F1, F2 and the mixing ratio of the fuels.

The properties of the respective fuels F1, F2 may be recognized by disposing an input unit on a vehicle via which an fuel supply worker inputs the properties of the respective fuels F1, F2 when they are supplied or may be recognized by causing an oil supply facility to transmit oil supply information such as a type, properties, and an supply amount of a fuel to be supplied to the vehicle via a communication device. Further, the properties of the respective fuels F1, F2 may be estimated also from, for example, signals detected by not shown fuel property sensors disposed to the first and second fuel tanks 41A, 41B, respectively. In the case, the fuel characteristics detection means causes the fuel property sensors to detect specific gravities, viscosities, electric conductivities, and the like of the fuels and to estimates the properties of the fuels based on the specific gravities, the viscosities, the electric conductivities, and the like.

In contrast, the fuel characteristics detection means can detect the ignition delay period in the compressed self-ignition diffusive combustion mode operation using signals detected by an in-cylinder pressure sensor and an ignition timing sensor which are not shown and the crank angle sensor 16. For example, the fuel characteristics detection means can calculate the ignition delay period based on a change of the in-cylinder pressure detected from the in-cylinder pressure sensor in the compressed self-ignition diffusive combustion mode operation. The fuel characteristics detection means can measure an ion current using an ion probe as the ignition timing sensor in the compressed self-ignition diffusive combustion mode operation and can calculate the ignition delay period based on the ion current. Further, the fuel characteristics detection means can also calculate the ignition delay period based on a change of a crank angle speed detected from the crank angle sensor 16 in the compressed self-ignition diffusive combustion mode operation. Note that, in the multi-fuel internal combustion engine of the first embodiment, it is assumed that the in-cylinder pressure sensor is not disposed.

Further, a heat generation ratio or a value based on the heat generation ratio in the compressed self-ignition diffusive combustion mode operation may be used as the ignitability index value I of the fuel. The heat generation ratio or the value based on the heat generation ratio can be determined based on the in-cylinder pressure detected from the in-cylinder pressure sensor and on the crank angle detected from the crank angle sensor 16.

The fuel injection control means of the electronic control unit 1 of the first embodiment determines the ignitability to the fuel in the combustion chamber CC based on the ignitability index value I of the fuel, which is detected as described above, of the fuel introduced into the combustion chamber CC, on the water temperature tw detected from a water temperature sensor 81 shown in FIG. 1, and on the intake air temperature ta detected from an intake air temperature sensor 82 shown in FIG. 1 and switches the fuel injection modes according to a result of the determination in the compressed self-ignition diffusive combustion mode operation. For example, the ordinary fuel injection mode and the composite fuel injection mode described above are prepared as the fuel injection modes of the first embodiment, and the fuel injection control means is caused to select the ordinary fuel injection mode when the ignitability to the fuel in the combustion chamber CC is higher than a predetermined ignitability and to select the composite fuel injection mode when the ignitability is lower than the predetermined ignitability.

Figure 3:
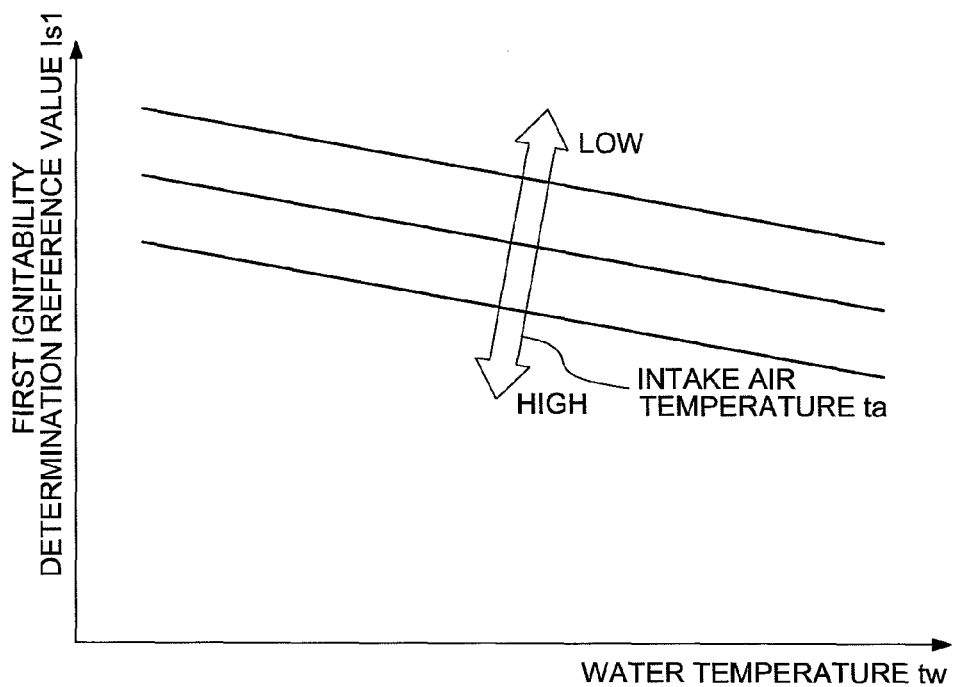
FIG. 3 is a view showing an example of fuel injection mode switch condition map data used when a fuel injection mode is switched.

As a specific measure, the fuel injection control means of the first embodiment is caused to compare the ignitability index value I of the fuel introduced into the combustion chamber CC with an ignitability determination threshold value (hereinafter, called "first ignitability determination reference value") Is1 which is a fuel injection mode switch condition set in consideration of the water temperature tw and the intake air temperature ta and to select the fuel injection modes according to a result of the comparison. The first ignitability determination reference value Is1 means an ignitability index value as to a fuel having a lowest compressed ignitability which permits an excellent compressed self-ignition diffusive combustion in which an increase of the amount of generation of NOx and noise and the like in combustion described above are not caused only by the main injection in the present states of the water temperature tw and the intake air temperature ta, and exhibits a higher value in a lower water temperature tw and a lower intake air temperature ta. Here, fuel injection mode switch condition map data of FIG. 3 is previously prepared by which a higher first ignitability determination reference value Is1 is selected when the water temperature tw and the intake air temperature ta are lower using the water temperature tw and the intake air temperature ta as parameters. Accordingly, the fuel injection control means of the first embodiment is set so as to select the ordinary fuel injection mode when the ignitability index value I is larger than the first ignitability determination reference value Is1 and to select the composite fuel injection mode when the ignitability index value I is smaller than the first ignitability determination reference value Is1.

Incidentally, in the compressed self-ignition diffusive combustion mode, ordinarily, a fuel injection timing TM of the main injection (hereinafter, called "main injection timing") is set at a timing at which an excellent compressed self-ignition diffusive combustion is permitted in a latter period of the compression stroke. In general, a timing, at which the piston 13 is positioned in the vicinity of a compression upper dead point, is set as the main injection timing TM. Accordingly, it is necessary to set a fuel injection timing (hereinafter, called "previous injection timing") TP of the previous injection to a timing at which a previous-injected fuel is self-ignited and increases the in-cylinder temperature and the in-cylinder pressure before the main injection timing TM. In the compressed self-ignition diffusive combustion mode operation, since a lower ignitability to the fuel in the combustion chamber CC more increases the ignition delay period, there is a possibility that the previous-injected fuel does not cause an ignition reaction in the combustion chamber CC until the main injection timing TM is reached. Accordingly, it is preferable to set the previous injection timing TP to an earlier timing to the main injection timing TM as the ignitability to the previous-injected fuel in the combustion chamber CC is lower, and the previous injection timing TP is set at a predetermined timing according to the ignitability in a period from an intake stroke to the compression stroke. For example, the ignitability to the previous-injected fuel in the combustion chamber CC is higher than a predetermined ignitability, the fuel is previous-injected at a predetermined timing at the beginning of the compression stroke, whereas when the ignitability is lower than the predetermined ignitability, the fuel is previous-injected at a predetermined timing in the intake stroke.

Figure 4:
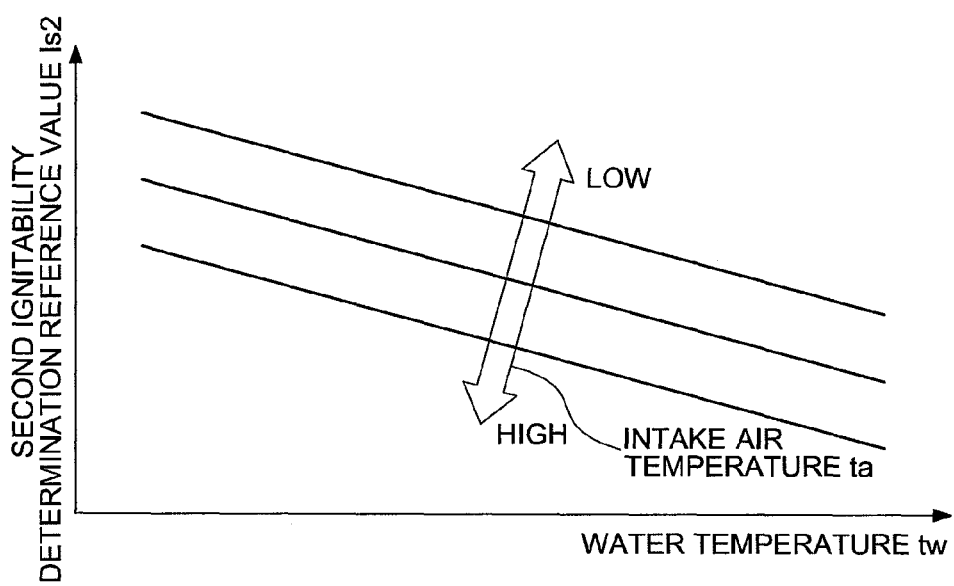
FIG. 4 is a view showing an example of previous injection timing switch condition map data used when previous injection timing is switched.

Specifically, the fuel injection control means of the first embodiment is caused to compare an ignitability index value IP (=ignitability index value I) of the previous-injected fuel with an ignitability determination threshold value (hereinafter, called "second ignitability determination reference value") Is2 as a previous injection timing switch condition set in consideration of the water temperature tw and the intake air temperature ta and to select a compression stroke previous injection or an intake stroke previous injection according to a result of the comparison. The second ignitability determination reference value Is2 means an ignitability index value of a fuel having a lowest compressed ignitability of the fuels, which are previous injected when the compression stroke starts and can increase the in-cylinder temperature and the in-cylinder pressure by being self-injected until the main injection timing TM is reached, in the present states of the water temperature tw and the intake air temperature ta, and exhibits a higher value in a lower water temperature tw and a lower intake air temperature ta. Here, previous injection timing switch condition map data of FIG. 4 is previously prepared by which a higher second ignitability determination reference value Is2 is selected when the water temperature tw and the intake air temperature ta are lower using the water temperature tw and the intake air temperature ta as parameters likewise the first ignitability determination reference value Is1 described above. Accordingly, the fuel injection control means of the first embodiment is set such that when the ignitability index value I of the previous-injected fuel is equal to or larger than the second ignitability determination reference value Is2, the fuel injection control means calculates a previous injection timing TPc at the beginning of the compression stroke, whereas when the ignitability index value I is smaller than the second ignitability determination reference value Is2, the fuel injection control means calculates a previous injection timing TPs of the intake stroke. When the ignitability index value I of the previous-injected fuel is smaller, earlier timings are selected as the respective previous injection timings TPc, TPs. Note that respective inherent fuel injection timings may be set as to the respective previous injection timings TPc, TPs.

In the composite fuel injection mode of the first embodiment, since a fast combustion of the main-injected fuel can be avoided by the combustion of the previous-injected fuel as described later, the fast combustion can be prevented without performing a delay angle control of the main injection timing TM by which the amount of generation of PM and smoke may be increased. On the contrary, when an advance angle control is performed to the main injection timing TM, generation of PM and smoke can be suppressed while suppressing the fast combustion. Accordingly, the fuel injection control means of the first embodiment is caused to set the main injection timing TM in the composite fuel injection mode on an advance angle side in a degree by which at least the generation of PM and the like can be suppressed.

Further, the fuel injection control means of the first embodiment is caused to calculate a fuel injection amount FP when the previous injection is performed (hereinafter, called "previous injection amount") and a fuel injection amount FM of the main injection (hereinafter, called "main injection amount").

The increase ratios of the in-cylinder temperature and the in-cylinder pressure caused by the combustion reaction of the previous injection increase as the amount of the previous-injected fuel increases. On the contrary, the increase ratios of the in-cylinder temperature and the in-cylinder pressure decrease as the compressed ignitability of the previous-injected fuel is lower or as the intake air temperature ta of intake air introduced into the combustion chamber CC is lower. Accordingly, the in-cylinder temperature and the in-cylinder pressure at the time do not effectively increase unless the previous injection amount FP is increased as the compressed ignitability (ignitability index value I) of the fuel introduced into the combustion chamber CC in the previous injection and the intake air temperature ta are lower.

In contrast, since an excessive increase of the previous injection amount FP of fuel causes a fast combustion of the injected fuel, the excessive increase of the injection amount FP is not preferable because the noise and the like described above are generated by the excessively increased previous injection amount FP in addition to a problem that the in-cylinder temperature and the in-cylinder pressure are increased. Whether or not the previous injection amount FP is excessive can be determined from an intake air pressure Pin of intake air introduced into the combustion chamber CC and the engine speed Ne. For example, when the previous injection amount FP is the same amount, a lower intake air pressure Pin and a lower engine speed Ne make the combustion caused by the previous-injected fuel fast. Thus, even if the previous injection amount FP is the same, it is determined that the previous injection amount FP becomes excessive as the intake air pressure Pin and the engine speed Ne become lower.

Thus, an amount, which is preferable to increase the in-cylinder temperature and the in-cylinder pressure, is set as the previous injection amount FP in consideration of the compressed ignitability (ignitability index value I) of the previous-injected fuel, the intake air temperature ta, the intake air pressure Pin, and the engine speed Ne. For example, the fuel injection control means of the first embodiment is caused to calculate a previous injection amount (hereinafter, called "reference previous injection amount") FP1, which becomes a reference according to the compressed ignitability (ignitability index value I) of the previous-injected fuel and the intake air temperature ta, and an upper limit value FP2 as an increase limit value of the previous injection amount according to the intake air pressure Pin and the engine speed Ne (hereinafter, called "previous injection amount upper limit guard value"), and the previous injection amount FP is set according to a result of comparison of the previous injection amount FP1 with upper limit value FP2. When the reference previous injection amount FP1 is equal to or smaller than the previous injection amount upper limit guard value FP2, the reference previous injection amount FP1 is set as the previous injection amount FP, whereas when the reference previous injection amount FP1 is larger than the previous injection amount upper limit guard value FP2, the previous injection amount upper limit guard value FP2 is set as the previous injection amount FP.

Figure 5:
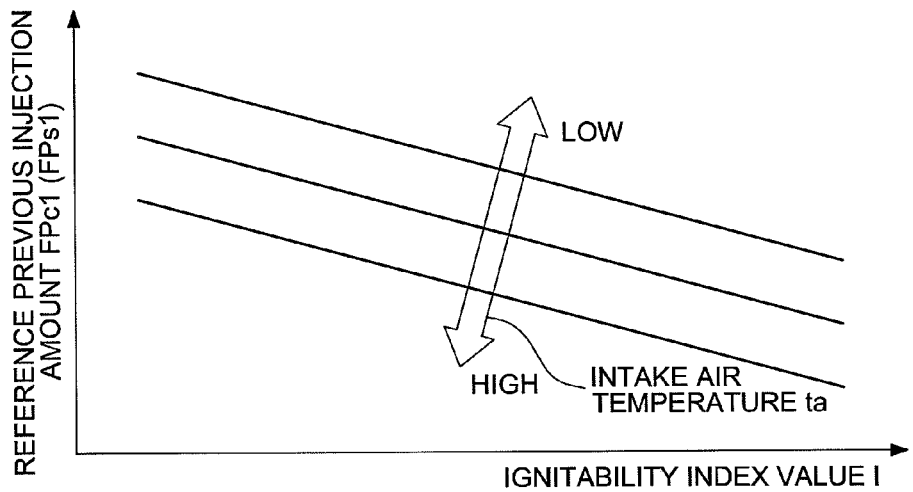
FIG. 5 a view showing an example of reference previous injection amount selection map data used when a reference previous injection amount is selected.

The reference previous injection amount FP1 is determined using reference previous injection amount selection map data of FIG. 5 by which a higher value is selected as the ignitability index value I and the intake air temperature ta which are used as parameters in the map are lower. In contrast, the previous injection amount upper limit guard value FP2 is determined using selection map data of the previous injection amount upper limit guard value of FIG. 6 by which a lower value is selected as the intake air pressure Pin and the engine speed Ne which are used as parameters in the map are lower. That is, the previous injection amount upper limit guard value FP2 is more reduced as the intake air pressure Pin and the engine speed Ne are lower, thereby reducing the previous injection amount FP. The reference previous injection amount FP1 and the previous injection amount upper limit guard value FP2 are divided to a reference previous injection amount FPc1 and a previous injection amount upper limit guard value FPc2 at the beginning of the compression stroke as well as to a reference previous injection amount FPs1 and a previous injection amount upper limit guard value FPs2 of the intake stroke, respectively. Accordingly, the previous injection amount FP is also divided to a previous injection amount FPc at the beginning of the compression stroke and a previous injection amount FPs of the intake stroke.

Note that although the reference previous injection amount FPc1 at the beginning of the compression stroke and the reference previous injection amount FPs1 of the intake stroke are described in bundle in FIG. 5 for the purpose of convenience, to strictly say, reference previous injection amount selection map data are prepared separately to the reference previous injection amount FPc1 and the reference previous injection amount FPs1. Likewise, although the previous injection amount upper limit guard value FPc2 and the previous injection amount upper limit guard value FPs2 of the intake stroke are described in bundle in FIG. 6 for the purpose of convenience, to strictly say, the selection map data of the previous injection amount upper limit guard value is prepared separately to the previous injection amount upper limit guard value FPc2 and the previous injection amount upper limit guard value FPs2.

An example of a control operation of the electronic control unit 1 in the multi-fuel internal combustion engine of the first embodiment will be explained below based on a flowchart of FIG. 7.

First, the electronic control unit 1 of the first embodiment detects the engine speed Ne and the engine load Kl of the multi-fuel internal combustion engine based on signals detected by the crank angle sensor 16 and the air flow meter 23, respectively (step ST1). Then, the electronic control unit 1 causes the combustion mode set means to determine a combustion mode optimum to a combination of the engine speed Ne and the engine load Kl from the combustion mode map data shown in FIG. 2 and determines whether or not the combustion mode is the compressed self-ignition diffusive combustion mode (step ST2).

When the compressed self-ignition diffusive combustion mode is selected, the fuel characteristics detection means of the electronic control unit 1 detects the ignitability index value I of the fuel introduced into the combustion chamber CC as described above (step ST3), and further the electronic control unit 1 calculates the first ignitability determination reference value Is1 and the second ignitability determination reference value Is2 by checking the water temperature tw and the intake air temperature ta of the multi-fuel internal combustion engine for the fuel injection mode switch condition map data shown in FIG. 3 and the previous injection timing switch condition map data shown in FIG. 4 (step ST4). The first ignitability determination reference value Is1 and the second ignitability determination reference value Is2 at the time are set to higher values as the water temperature tw and the intake air temperature ta are lower (that is, as the water temperature tw and the intake air temperature ta are conditions severer to the self-ignition).

Then, the fuel injection control means of the electronic control unit 1 determines whether or not the ignitability index value I is equal to or larger than the first ignitability determination reference value Is1 (step ST5). When the ignitability index value I is equal to or larger than the first ignitability determination reference value Is1, it is shown that the ignitability is sufficiently secured to the main-injected fuel in the combustion chamber CC. Accordingly, in the case, the ordinary fuel injection mode is selected, and the compressed self-ignition diffusive combustion is performed using only the main injection via steps ST21 to ST23.

In contrast, when the ignitability index value I is smaller than the first ignitability determination reference value Is1 on the contrary, since it is shown that the ignitability is low to the main-injected fuel in the combustion chamber CC, the composite fuel injection mode is selected. In the first embodiment, after the determination at step ST5 becomes NO and the composite fuel injection mode is selected, the fuel injection control means is caused to determine whether or not the ignitability index value I is equal to or larger than the second ignitability determination reference value Is2 (step ST6).

The case, in which the ignitability index value I is equal to or larger than the second ignitability determination reference value Is2, shows that a fuel is previous-injected at the beginning of the compression stroke and self-ignited until the main injection timing TM is reached to thereby increase the in-cylinder temperature and the in-cylinder pressure. In contrast, the case, in which the ignitability index value I is smaller than the second ignitability determination reference value Is2, shows that unless a fuel is previous-injected at an earlier timing as in the intake stroke, the fuel is self-ignited until the main injection timing TM is reached and the in-cylinder temperature and the in-cylinder pressure cannot be increased.

Accordingly, when the determination is YES at step ST6, the fuel injection control means of the first embodiment determines the previous injection timing TPc at the beginning of the compression stroke according to the ignitability (ignitability index value I, water temperature tw and intake air temperature ta) to the previous-injected fuel in the combustion chamber CC to perform the previous injection at the beginning of the compression stroke (step ST7).

Further, the fuel injection control means determines the reference previous injection amount FPc1 and the previous injection amount upper limit guard value FPc2 at the beginning of the compression stroke (steps ST8, ST9). At the time, the reference previous injection amount FPc1 is selected from the reference previous injection amount selection map data shown in FIG. 5 based on the ignitability index value I and the intake air temperature ta, and the previous injection amount upper limit guard value FPc2 is selected from the selection map data of the previous injection amount upper limit guard value shown in FIG. 6 based on the intake air pressure Pin and the engine speed Ne.

Thereafter, the fuel injection control means compares the reference previous injection amount FPc1 with the previous injection amount upper limit guard value FPc2 (step ST10), and when the reference previous injection amount FPc1 is equal to or smaller than the previous injection amount upper limit guard value FPc2, the fuel injection control means sets the reference previous injection amount FPc1 as the previous injection amount FPc at the beginning of the compression stroke (step ST11), and when the reference previous injection amount FPc1 is larger than the previous injection amount upper limit guard value FPc2, the fuel injection control means sets the previous injection amount upper limit guard value FPc2 as the previous injection amount FPc at the beginning of the compression stroke (step ST12).

When the set previous injection timing TPc is reached, the fuel injection control means performs the previous injection at the beginning of the compression stroke in the previous injection amount FPc set at step ST11 or step ST12 (step ST13). With the operation, in the multi-fuel internal combustion engine, the previous-injected fuel is self-ignited and combusted in the combustion chamber CC and increases the in-cylinder temperature and the in-cylinder pressure until the main injection timing TM is reached.

In contrast, when the determination at step ST6 is NO, the fuel injection control means determines the previous injection timing TPs of the intake stroke according to the ignitability to the previous-injected fuel in the combustion chamber CC to perform the previous injection in the intake stroke (step ST14).

Further, the fuel injection control means determines the reference previous injection amount FPs1 and the previous injection amount upper limit guard value FPs2 of the intake stroke (steps ST15, ST16). At the time, the reference previous injection amount FPs1 is selected from the reference previous injection amount selection map data shown in FIG. 5 based on the ignitability index value I and the intake air temperature ta, and the previous injection amount upper limit guard value FPs2 is selected from the selection map data of the previous injection amount upper limit guard value shown in FIG. 6 based on the intake air pressure Pin and the engine speed Ne.

Thereafter, the fuel injection control means compares the reference previous injection amount FPs1 with the previous injection amount upper limit guard value FPs2 (step ST17), and when the reference previous injection amount FPs1 is equal to or smaller than the previous injection amount upper limit guard value FPs2, the fuel injection control means sets the reference previous injection amount FPs1 as the previous injection amount FPs of the intake stroke (step ST18), and when the reference previous injection amount FPs1 is larger than the previous injection amount upper limit guard value FPs2, the fuel injection control means sets the previous injection amount upper limit guard value FPs2 as the previous injection amount FPs of the intake stroke (step S19).

When the set previous injection timing TPs is reached, the fuel injection control means performs the previous injection of the intake stroke in the previous injection amount FPs set at step ST18 or step ST19 (step ST20). With the operation, in the multi-fuel internal combustion engine, the previous-injected fuel is self-ignited in the combustion chamber CC in the compression stroke after a sufficient time passes so that in-cylinder temperature and the in-cylinder pressure are increased until the main injection timing TM is reached.

The fuel injection control means of the first embodiment calculates the main injection timing TM and a main injection amount FM until, for example, the fuel, which is previous-injected at the beginning of the compression stroke or in the intake stroke, is self-ignited (steps ST21, ST22), and causes the main injection to be performed in the main injection amount FM when the main injection timing TM is reached (step ST23).

In the multi-fuel internal combustion engine at the time, since the in-cylinder temperature and the in-cylinder pressure are increased by the combustion of the previous-injected fuel, the ignitability to the main-injected fuel in the combustion chamber CC is improved. Accordingly, in the multi-fuel internal combustion engine, since even a fuel having a low compressed ignitability becomes liable to be self-ignited until the main injection timing TM is reached, an excellent compressed self-ignition diffusive combustion can be realized by the main-injected fuel having the low compressed ignitability.

Note that when a combustion mode other than the compressed self-ignition diffusive combustion mode is selected at step ST2, the fuel injection control means of the first embodiment performs a fuel injection control as to the combustion mode (step ST24).

As shown above, since the multi-fuel internal combustion engine of the first embodiment can place the ignitability to the main-injected fuel in a good state regardless whether the compressed ignitability of the main-injected fuel itself introduced into the combustion chamber CC is good or bad, the multi-fuel internal combustion engine can be operated in a stable compressed self-ignition diffusive combustion mode in which knocking is not caused by an abnormal combustion. Accordingly, in the multi-fuel internal combustion engine, even if the compressed ignitability of the main-injected fuel is low, since the fast combustion does not occur in the compressed self-ignition diffusive combustion, the increase of the amount of generation of NOx and deterioration of the heat efficiency (deterioration of fuel consumption and an output drop) can be suppressed. In the multi-fuel internal combustion engine, since diesel knock does not occur in the compressed self-ignition diffusive combustion even if a fuel has a low compressed ignitability, noise and vibration in combustion can be suppressed and further an ignition in the compressed self-ignition diffusive combustion can be stabilized even if the fuel has a low compressed ignitability so that a torque variation caused by a repetition of unstable ignition and combustion is suppressed. Further, in the multi-fuel internal combustion engine, since the main injection timing TM is set on the advance angle side when the composite fuel injection mode is selected, generation of PM and smoke can be also suppressed in the compressed self-ignition diffusive combustion. Furthermore, in the multi-fuel internal combustion engine, since the compressed self-ignition diffusive combustion can be stably performed even if the compressed ignitability of the mixed fuel is deteriorated, the mixing ratio of the second fuel F2 having the high evaporation property can be increased, thereby the generation of PM and smoke can be suppressed in the compressed self-ignition diffusive combustion. Further, in the multi-fuel internal combustion engine, since knocking due to the abnormal combustion is suppressed, the multi-fuel internal combustion engine can be operated in a high load, thereby a specific output and the heat efficiency can be also improved.

Incidentally, in the multi-fuel internal combustion engine of the first embodiment, the previous-injected fuel is self-ignited. However, when the previous-injected fuel cannot be self-ignited or is extinguished at once even if it is self-ignited because the previous-injected fuel has an excessively low compressed ignitability, the previous-injected fuel may be ignited using the ignition plug 71. In the case, the previous-injected fuel is preferably a fuel having a high flammability, and thus the mixed fuel preferably contains a fuel having a high flammability such as hydrogen, a compressed natural gas (CNG), and an alcohol fuel. In the case, for example, a high flammable fuel is prepared as the second fuel F2 in the multi-fuel internal combustion engine described above.

In the multi-fuel internal combustion engine of the case, the mixture gas of a high flammable previous-injected fuel formed in the combustion chamber CC is ignited by the ignition plug 71, and the in-cylinder temperature and the in-cylinder pressure are increased by the combustion caused by the mixture gas. Accordingly, it is sufficient to set the previous injection timing TP and the previous injection amount FP as well as the ignition timing of the previous-injected fuel so that a combustion capable of increasing the in-cylinder temperature and the in-cylinder pressure can be performed until the main injection timing TM is reached. For example, the previous injection timing TP is set in a period from the intake stroke to the compression stroke so that a pre-mixture gas of the rich previous-injected fuel is formed in the periphery of the ignition plug 71 in the combustion chamber CC as well as a lean pre-mixture gas is further formed in the periphery of the pre-mixture gas until the main injection timing TM is reached, and an ignition timing is set so that the in-cylinder temperature and the in-cylinder pressure is increased by igniting the rich pre-mixture gas until the main injection timing TM is reached. With the operation, since an excellent compressed self-ignition diffusive combustion can be performed using the mixed fuel having the low ignitability also in the multi-fuel internal combustion engine in the case, the same advantage as that described above can be achieved.

Further, although the mixed fuel prepared by the fuel mixing means 53 is used as the previous-injected fuel in the multi-fuel internal combustion engine of the first embodiment, a fuel dedicated to the previous injection may be prepared separately from the mixed fuel. For example, the fuel dedicated to the previous injection is preferably a fuel having a good compressed ignitability.

Further, in the multi-fuel internal combustion engine of the first embodiment, the in-cylinder temperature and the in-cylinder pressure are increased by the combustion of the previous-injected fuel to thereby improve the ignitability to the main-injected fuel in the combustion chamber CC. However, the ignition of the main-injected fuel having the low pressure ignitability may be accelerated using flame cores and heat generation, which are obtained when the previous-injected fuel is self-ignited, as a fire lighting source, and the same advantage as that described above can be achieved even in the manner. That is, the multi-fuel internal combustion engine improves the ignitability to the main-injected fuel in the combustion chamber CC by performing the main injection when the flame cores or heat is generated by the ignition caused by the spark ignition of the previous-injected fuel.

In the case, in the example described above, the main injection timing TM is set so as to be reached when or just after the previous-injected fuel is self-ignited by delaying the previous injection timing TP when the composite fuel injection mode is selected. Accordingly, when the previous-injected fuel has a high compressed ignitability, it is also considered that the main injection timing TM is reached just after the previous injection timing TP. Thus, in the case, the previous injection timing TP is set at a timing according to the compressed ignitability of the previous-injected fuel in the period from the intake stroke to the latter stage of the compression stroke. Note that since it is difficult to continuously perform the previous injection and the main injection by one fuel injection valve 57, two in-cylinder direct injection fuel injection valves may be disposed in one combustion chamber CC and may be separately used for the previous injection and for the main injection, respectively.

Further, when the previous-injected fuel is the high flammable fuel described above, the previous injection timing TP and the ignition timing are set so that the main injection timing TM is reached when or just after the mixture gas of the previous-injected fuel is ignited by the ignition plug 71. Accordingly, when the previous-injected fuel has a high flammability, the previous injection timing TP is set in the period from the intake stroke to the compression stroke so that a pre-mixture gas of the rich previous-injected fuel is formed in the periphery of the ignition plug 71 in the combustion chamber CC as well as a lean pre-mixture gas is formed in the periphery of the pre-mixture gas until the main injection timing TM is reached, and the ignition timing is set so that the main injection timing TM is reached when or just after the rich pre-mixture gas is ignited and flame cores are generated.

Second Embodiment

Figure 8:
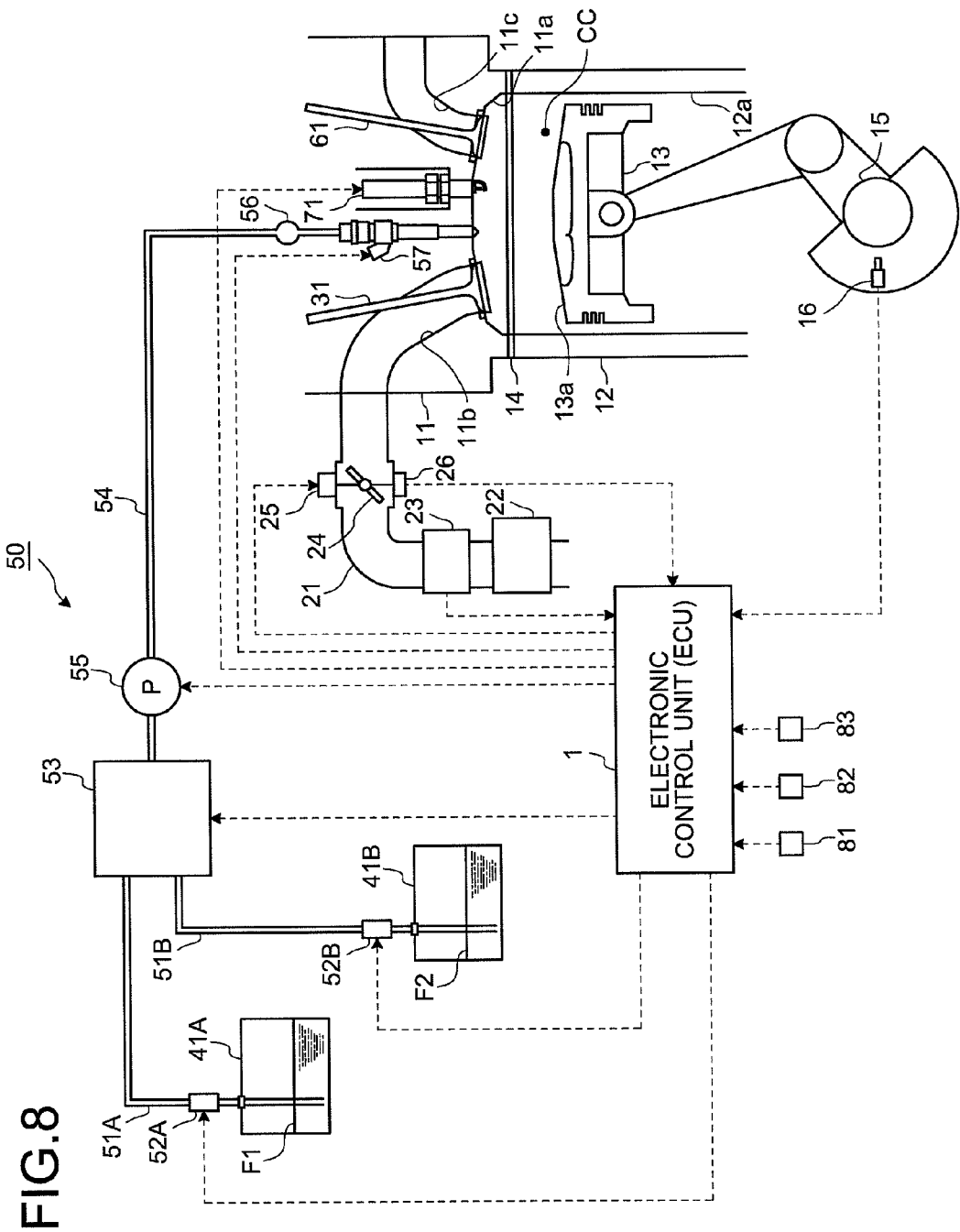
FIG. 8 is a view showing a configuration of a second embodiment of the multi-fuel internal combustion engine according to the present invention.
Figure 9:
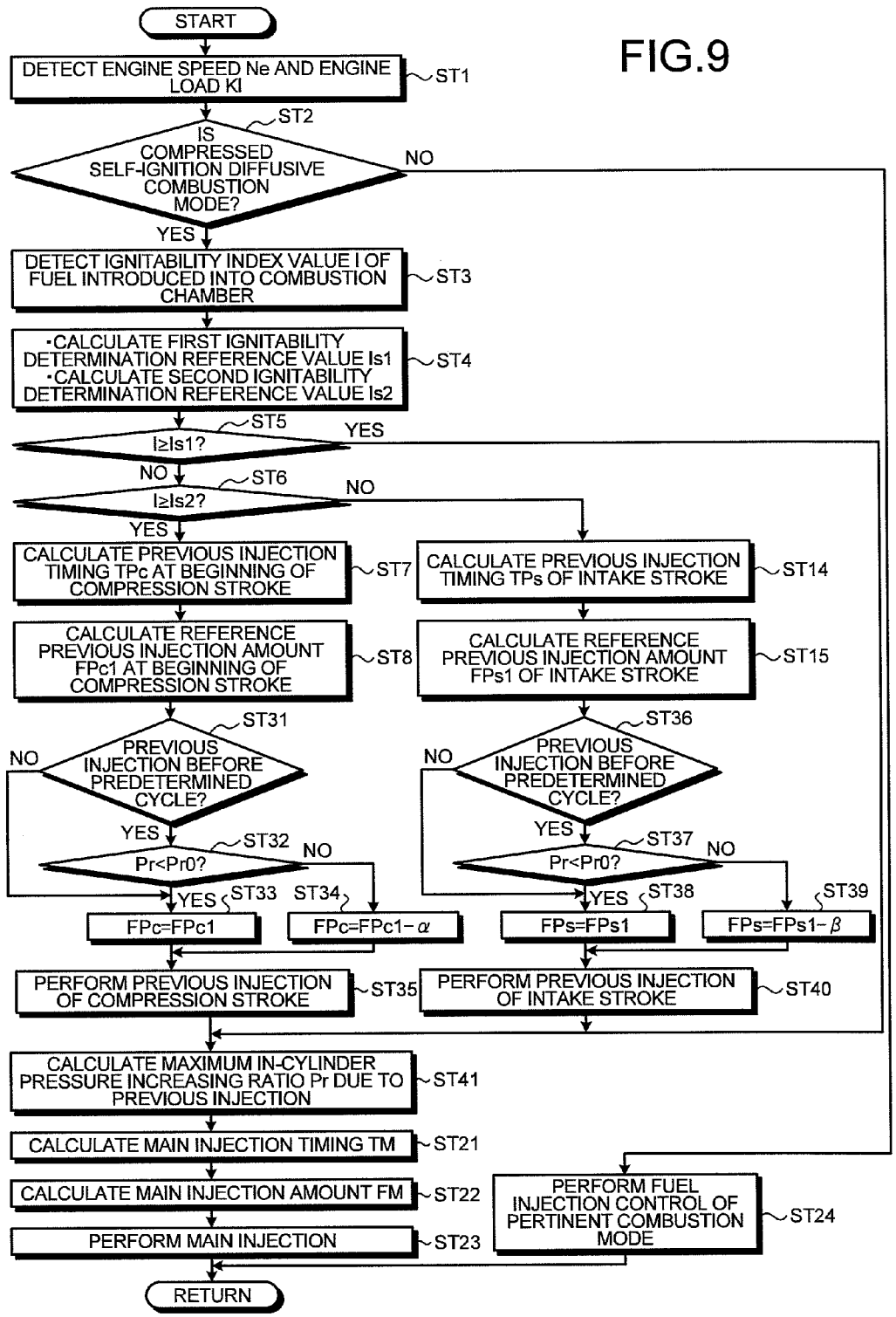
FIG. 9 is a flowchart explaining a combustion injection control operation in the multi-fuel internal combustion engine of the second embodiment.

Next, a second embodiment of the multi-fuel internal combustion engine according to the present invention will be explained based on FIGS. 8 and 9.

Figure 6:
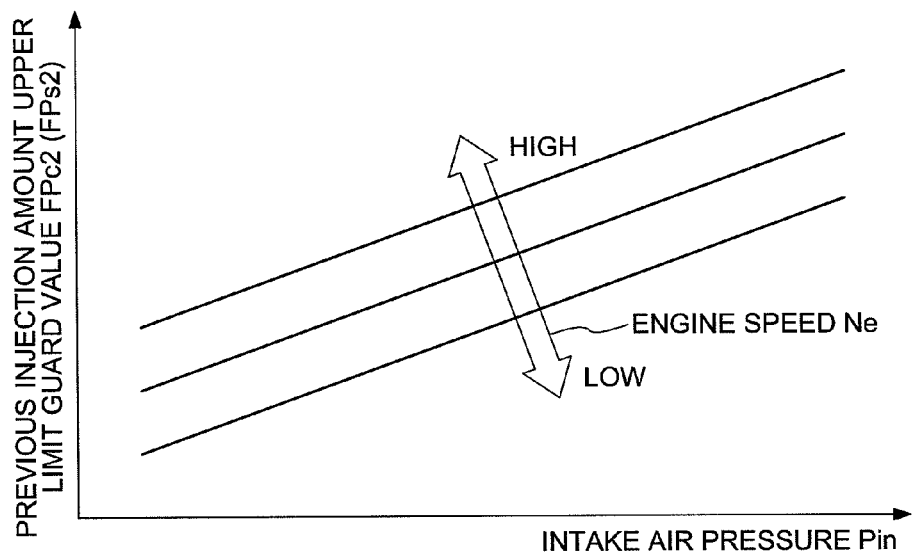
FIG. 6 is a view showing an example of selection map data of a previous injection amount upper limit guard value when an upper limit guard value of a previous injection amount is selected.

In general, when the in-cylinder pressure in the combustion chamber CC can be detected, an ignition timing of the previous-injected fuel and an in-cylinder pressure increase ratio can be found from a change of the pressure. Accordingly, when the in-cylinder pressure can be detected or estimated in the multi-fuel internal combustion engine of the first embodiment described above, whether or not the previous-injected fuel is fast combusted can be determined. Further, since the in-cylinder pressure is more increased as the previous injection amount FP more increases, the previous injection amount FP can be calculated back also from the in-cylinder pressure increase ratio resulting from the previous injection. Accordingly, when the in-cylinder pressure increase ratio is fed back in a next previous injection, an appropriate previous injection amount FP can be set without preparing the selection map data of the previous injection amount upper limit guard value as shown in FIG. 6 of the first embodiment.

Thus, the second embodiment will explain a multi-fuel internal combustion engine configured capable of detecting or estimating the in-cylinder pressure. Typically exemplified here is the multi-fuel internal combustion engine of the first embodiment provided with an in-cylinder pressure sensor 83 shown in FIG. 8 so that the in-cylinder pressure can be detected.

Specifically, first, in the second embodiment, a threshold value Pr0 of the in-cylinder pressure increase ratio, which is used when whether or a not a fast combustion is performed is determined (hereinafter, called "combustion state determination reference value"), is prepared. The combustion state determination reference value Pr0 sets a maximum value of the in-cylinder pressure increase ratio when, for example, the previous injection amount FP is increased or reduced to thereby increase the amount of generation of NOx and deteriorate the heat efficiency.

Accordingly, when a maximum in-cylinder pressure increase ratio Pr at the time the previous injection is performed is smaller than a combustion state determination reference value Pr0, a fast combustion is not caused as to the previous injection amount FP at the time of the previous injection.

In the first embodiment, an excessive previous injection amount FP by which the fast combustion is caused can be avoided by using the selection map data of the previous injection amount upper limit guard value, whereas the previous injection amount FP, which can increase the in-cylinder temperature and the in-cylinder pressure to a maximum extent in a range in which the fast combustion is not caused, can be set. However, in the second embodiment, since the selection map data of the previous injection amount upper limit guard value is not used, a finally set previous injection amount FP is not always the amount by which the in-cylinder temperature and the in-cylinder pressure can be increased to the maximum extent. Accordingly, the second embodiment is configured capable of setting the previous injection amount FP by which the in-cylinder temperature and the in-cylinder pressure can be increased to the maximum extent in a state that occurrence of the fast combustion is not concerned. For example, the reference previous injection amount FP1 is calculated by checking the ignitability index value I and the intake air temperature to for the reference previous injection amount selection map data of FIG. 5 also in the second embodiment likewise the first embodiment. However, the reference previous injection amount selection map data of the second embodiment is different from that of the first embodiment in that the reference previous injection amount selection map data of the second embodiment stores the reference previous injection amount FP1 which can increase the in-cylinder temperature and the in-cylinder pressure to the maximum extents without causing the fast combustion in the state of the ignitability index value I and the intake air temperature ta.

In contrast, when, for example, the maximum in-cylinder pressure increase ratio Pr in the previous injection before a predetermined cycle is equal to or larger than the combustion state determination reference value Pr0 (that is, the fast combustion occurs), it can be estimated that the previous injection amount FP at the time is excessively large.

Since there is a less possibility that the ignitability index value I and the intake air temperature ta largely change in several cycles, it cannot be supposed as a rule that a large difference occurs in the reference previous injection amount FP1 selected in the several cycles. Accordingly, when the fast combustion occurs before a predetermined cycle, there is a high possibility that the previous injection amount FP as large as the amount at the time is set thereafter. Thus, since the fast combustion is caused again before the predetermined cycle, the fast combustion must be avoided by reducing the previous injection amount FP. For example, since a correlation exists between the in-cylinder pressure increase ratio and the previous injection amount FP as described above, it is sufficient to set a fuel injection amount corresponding to a difference between a maximum in-cylinder pressure increase ratio Pr and the combustion state determination reference value Pr0 as the reduction amount.

An example of a control operation of an electronic control unit 1 in the multi-fuel internal combustion engine of the second embodiment will be explained below based on a flowchart of FIG. 9. Note that, in the following description, the control operation that is same as that of the first embodiment is not explained or will be explained briefly.

The electronic control unit 1 of the second embodiment sets the combustion mode likewise the first embodiment (step ST1, ST2), and when the compressed self-ignition diffusive combustion mode is set, the electronic control unit 1 switches the fuel injection modes (steps ST3 to ST6).

When the composite fuel injection mode is selected as well as the beginning of the compression stroke is selected as the previous injection timing TP at the time, a fuel injection control means of the electronic control unit 1 calculates the previous injection timing TPc at the beginning of the compression stroke and the reference previous injection amount FPc1 likewise the first embodiment (steps ST7, ST8).

In the second embodiment, next, when the fuel injection control means determines whether or not the previous injection is performed before a predetermined cycle (for example, one cycle) (step ST31), and when the previous injection is performed, the fuel injection control means compares the maximum in-cylinder pressure increase ratio Pr determined at step ST41 of the previous injection to be described later with the combustion state determination reference value Pr0 (step ST32). When the maximum in-cylinder pressure increase ratio Pr is smaller than the combustion state determination reference value Pr0 or when the determination at step ST31 is NO, the fuel injection control means sets the reference previous injection amount FPc1 determined at step ST8 as the previous injection amount FPc at the beginning of the compression stroke (step ST33). In contrast, when the maximum in-cylinder pressure increase ratio Pr is equal to or larger than the combustion state determination reference value Pr0, the fuel injection control means subtracts a reduction amount α determined to avoid the fast combustion from the reference previous injection amount FPc1 determined at the step ST8, and sets a resultant amount as the previous injection amount FPc at the beginning of the compression stroke (step ST34).

Then, when the set previous injection timing TPc is reached, the fuel injection control means performs the previous injection in the previous injection amount FPc set at step ST33 or step ST34 at the beginning of the compression stroke (step ST35). With the operation, also in the multi-fuel internal combustion engine of the second embodiment, the previous-injected fuel is self-ignited in the combustion chamber CC and increases the in-cylinder temperature and the in-cylinder pressure until the main injection timing TM is reached.

In contrast, when the composite fuel injection mode is selected as well as the intake stroke is selected as the previous injection timing TP at the time, the fuel injection control means calculates the previous injection timing TPs of the intake stroke and the reference previous injection amount FPs1 likewise the first embodiment (steps ST14, ST15).

Next, the fuel injection control means of the second embodiment determines whether or not the previous injection is performed before the predetermined cycle (for example, one cycle) (step ST36) likewise when the previous injection is performed at the beginning of the compression stroke described above, and when the previous injection is performed, the fuel injection control means compares the maximum in-cylinder pressure increase ratio Pr obtained by the previous injection of the previous cycle with the combustion state determination reference value Pr0 (step ST37). When the maximum in-cylinder pressure increase ratio Pr is smaller than the combustion state determination reference value Pr0 or when the determination at step ST36 is NO, the fuel injection control means sets the reference previous injection amount FPs1 determined at step ST15 as the previous injection amount FPs of the intake stroke (step ST38). In contrast, when the maximum in-cylinder pressure increase ratio Pr is equal to or larger than the combustion state determination reference value Pr0, the fuel injection control means subtracts a reduction amount β determined to avoid the fast combustion from the reference previous injection amount FPs1 determined at the step ST15, and sets a resultant value as the previous injection amount FPs of the intake stroke (step ST39).

Then, when the set previous injection timing TPs is reached, the fuel injection control means performs the previous injection in the previous injection amount FPs set at step ST38 or step ST39 in the intake stroke in (step ST40). With the operation, also in the multi-fuel internal combustion engine, the previous-injected fuel is self-ignited in the combustion chamber CC after a sufficient time passes so that the in-cylinder temperature and the in-cylinder pressure are increased until the main injection timing TM is reached.

Subsequently, in the second embodiment, the fuel injection control means detects the ignition timing of the previous-injected fuel based on a signal detected by the in-cylinder pressure sensor 83 and calculates the maximum in-cylinder pressure increase ratio Pr at the time (step ST41).

Further, the fuel injection control means of the second embodiment calculates the main injection timing TM and the main injection amount FM likewise the first embodiment (step ST21, ST22), and performs the main injection in the main injection amount FM when the main injection timing TM is reached (step ST23).

With the operation, in the multi-fuel internal combustion engine, since the in-cylinder temperature and the in-cylinder pressure are increased by the combustion of the previous-injected fuel until the main injection timing TM is reached likewise the first embodiment, even if the fuel main-injected into the engine is a fuel having a low compressed ignitability, the fuel is liable to be easily combusted so that an excellent compressed self-ignition diffusive combustion can be realized.

As shown above, since the multi-fuel internal combustion engine of the second embodiment can place the ignitability to the main-injected fuel in a good state regardless whether the compressed ignitability of the main-injected fuel itself introduced into the combustion chamber CC is good or bad, the multi-fuel internal combustion engine can be operated in a stable compressed self-ignition diffusive combustion mode in which knocking is not caused by an abnormal combustion. Accordingly, also the multi-fuel internal combustion engine of the second embodiment, the same advantage as that of the first embodiment such as an improvement of an emission performance and a noise/vibration performance in combustion, and the like can be achieved.

Incidentally, also in the multi-fuel internal combustion engine of the second embodiment, when the previous-injected fuel cannot be self-ignited or is extinguished at once even if it is self-ignited because the previous-injected fuel has an excessively low compressed ignitability as explained in the first embodiment described above, the previous-injected fuel may be ignited using the ignition plug 71. It is preferable that the previous-injected fuel in the case contains a high flammable fuel and has a high flammability. Further, also in the multi-fuel internal combustion engine of the second embodiment, a fuel dedicated for the previous injection may be prepared separately from the mixed fuel prepared by the fuel mixing means 53 as explained in the first embodiment described above likewise, or the ignition of the main-injected fuel having the low compressed ignitability may be accelerated using flame cores and heat generation, which are obtained when the previous-injected fuel is self-ignited or ignited by the ignition plug 71, as a fire lighting source.

Third Embodiment

Next, a third embodiment of the multi-fuel internal combustion engine according to the present invention will be explained based on FIG. 10.

Although the respective first and second embodiments described above exemplify so-called in-cylinder direct injection type multi-fuel internal combustion engines for directly injecting the mixed fuel composed of the first fuel F1 and the second fuel F2 into the combustion chamber CC, the third embodiment will exemplify a multi-fuel internal combustion engine for injecting the mixed fuel not only into the combustion chamber CC but also into the intake air port 11b.

Figure 10:
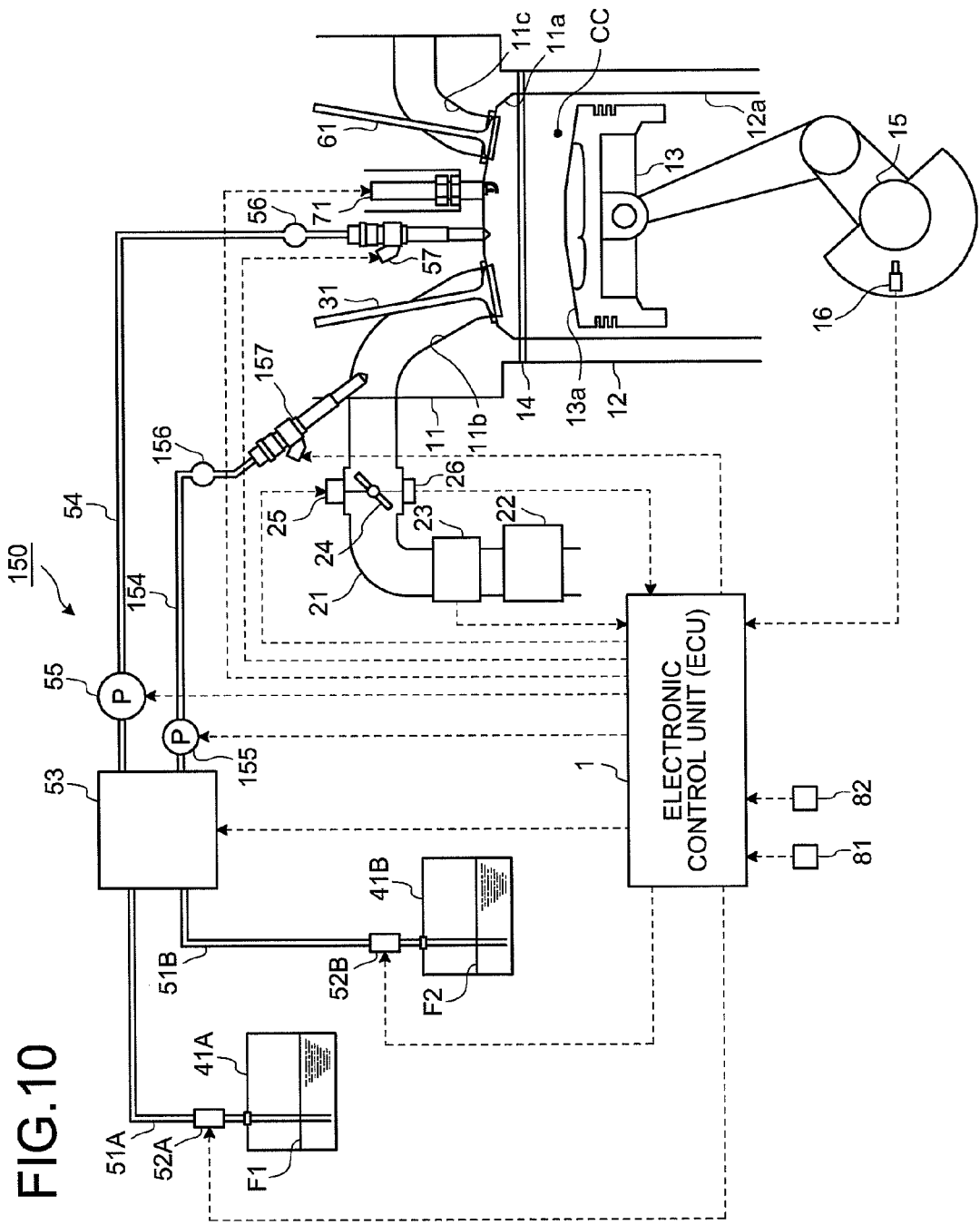
FIG. 10 is a view showing a configuration of a third embodiment of the multi-fuel internal combustion engine according to the present invention.

For example, this type of the multi-fuel internal combustion engine can be configured by replacing the fuel supply unit 50 with a fuel supply unit 150 shown in FIG. 10 in the multi-fuel internal combustion engines of the respective first and second embodiments. Note that FIG. 10 shows a case based on the multi-fuel internal combustion engine of the first embodiment.

The fuel supply unit 150 shown in FIG. 10 is provided with a fuel pump 155 for injecting the mixed fuel prepared by the fuel mixing means 53 to a fuel path 154, a delivery path 156 for distributing the mixed fuel in the fuel path 154 to the respective cylinders, and fuel injection valves 157 of the respective cylinders for injecting the mixed fuel supplied from the delivery path 156 to the intake air port 11b in addition to the various components of the fuel supply unit 50 in the first embodiment.

In the multi-fuel internal combustion engine of the third embodiment, as its basic fuel injection modes, for example, when the multi-fuel internal combustion engine is operated in the compressed self-ignition diffusive combustion mode, the mixed fuel is injected into the combustion chamber CC by driving and controlling the fuel injection valves 57 for in-cylinder direct injection, and when the multi-fuel internal combustion engine is operated in the premixed spark ignition flame propagation combustion mode, the mixed fuel is injected into the intake air port 11b by driving and controlling the fuel injection valves 157 for port injection.

In contrast, when the composite fuel injection mode described above is selected in the multi-fuel internal combustion engine, both the previous injection and the main injection may be performed by the fuel injection valves 57 for in-cylinder direct injection or only the previous injection may be performed by the fuel injection valves 157 for port injection. Then, the multi-fuel internal combustion engine is controlled likewise the first embodiment in any of the modes of the multi-fuel internal combustion engine and can achieve the same advantage as that of the multi-fuel internal combustion engine of the first embodiment. Note that when the multi-fuel internal combustion engine is based on the multi-fuel internal combustion engine of the second embodiment, the multi-fuel internal combustion engine is controlled likewise the second embodiment and achieves the same advantage as that of the multi-fuel internal combustion engine of the second embodiment.

Incidentally, also in the multi-fuel internal combustion engine of the third embodiment, when the previous-injected fuel cannot be self-ignited or is extinguished at once even if it is self-ignited because the previous-injected fuel has as an excessive low compressed ignitability as explained in the first embodiment described above, the previous-injected fuel may be ignited using the ignition plug 71. It is preferable that the previous-injected fuel in the case contains a high flammable fuel and has a high flammability. Further, also in the multi-fuel internal combustion engine of the third embodiment, the fuel dedicated for the previous injection may be prepared separately from the mixed fuel prepared by the fuel mixing means 53 as explained in the first embodiment described above likewise or the ignition of the main-injected fuel having the low compressed ignitability may be accelerated using flame cores and heat generation, which are obtained when the previous-injected fuel is self-ignited or ignited by the ignition plug 71, as a fire lighting source.

Fourth Embodiment

Next, a fourth embodiment of the multi-fuel internal combustion engine according to the present invention will be explained based on FIG. 11.

Although the respective first and second embodiments described above exemplify the multi-fuel internal combustion engines operated by introducing the mixed fuel previously mixed by the fuel mixing means 53 into the combustion chamber CC, the fourth embodiment will exemplify a multi-fuel internal combustion engine which can be operated by separately introducing the respective fuels (first fuel F1 and second fuel F2) into the combustion chamber CC without using the fuel mixing means 53.

Figure 11:
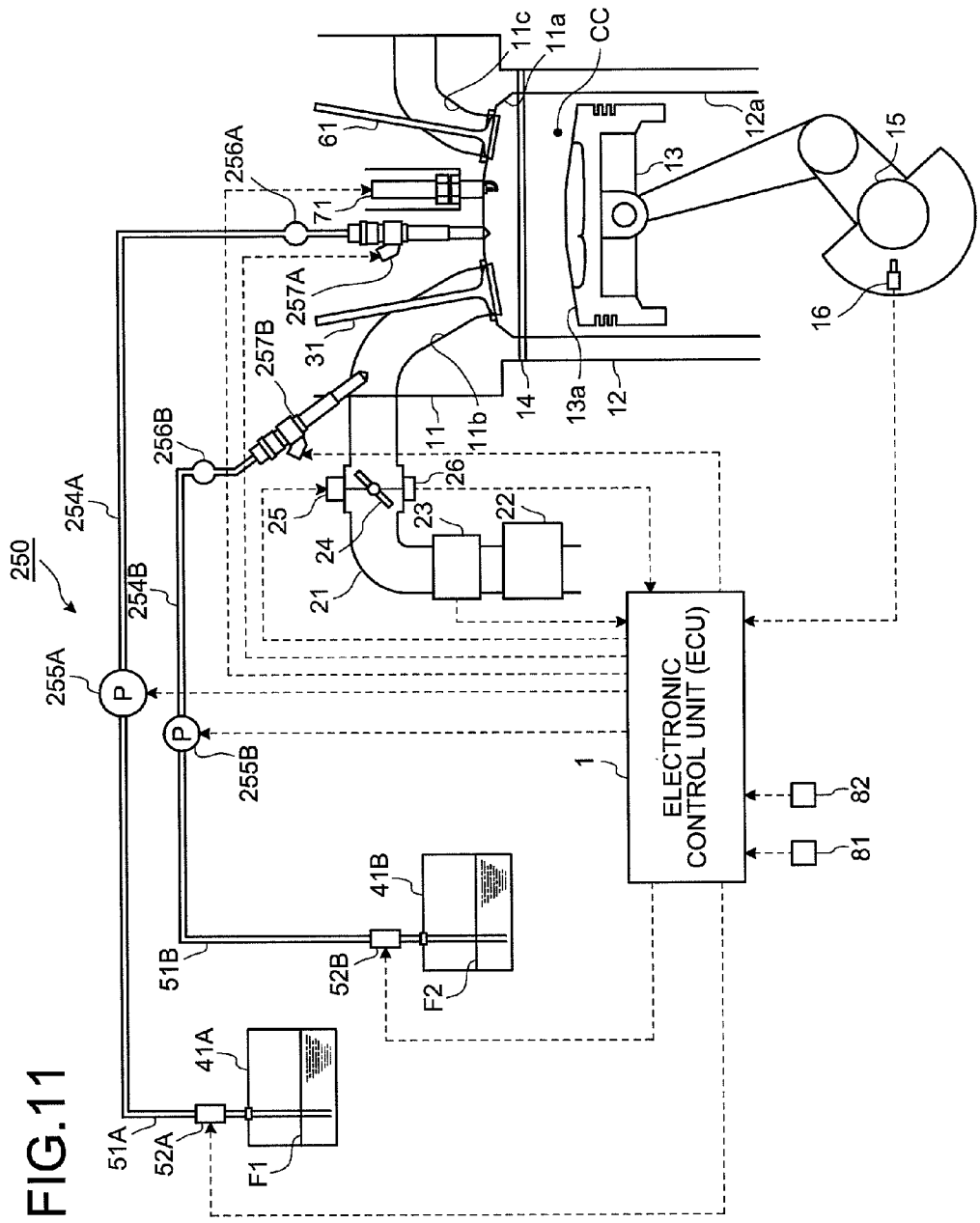
FIG. 11 is a view showing a configuration of a fourth embodiment of the multi-fuel internal combustion engine according to the present invention.

For example, this type of the multi-fuel internal combustion engine may be configured by replacing the fuel supply unit 50 with a fuel supply unit 250 shown in FIG. 11 in the multi-fuel internal combustion engines of the respective first and second embodiments. Note that FIG. 11 shows a case based on the multi-fuel internal combustion engine of the first embodiment.

The fuel supply unit 250 shown in FIG. 11 is provided with a first fuel supply means for directly injecting the first fuel F1 into the combustion chamber CC and a second fuel supply means for injecting the second fuel F2 into the intake air port 11b. The first fuel supply means includes the first feed pump 52A for pumping the first fuel F1 from the first fuel tank 41A and feeding the first fuel F1 to the first fuel path 51A, a high pressure fuel pump 255A for feeding the first fuel F1 in the first fuel path 51A to a high pressure fuel path 254A under pressure, a delivery path 256A for distributing the first fuel F1 in the high pressure fuel path 254A to the respective cylinders, and fuel injection valves 257A of the respective cylinders for injecting the first fuel F1 supplied from the delivery path 256A into the combustion chamber CC. In contrast, second fuel supply means includes the second feed pump 52B for pumping the second fuel F2 from the second fuel tank 41B and feeding the second fuel F2 to the second fuel path 51B, a high pressure fuel pump 255B for feeding the second fuel F2 in the second fuel path 51B to a third fuel path 254B under pressure, a delivery path 256B for distributing the second fuel F2 in the third fuel path 254B to the respective cylinders, and fuel injection valves 257B of the respective cylinders for injecting the second fuel F2 supplied from the delivery path 256B into the intake air port 11b.

The fourth embodiment will exemplify, for example, the multi-fuel internal combustion engine in which a fuel represented by gasoline and the like that has a low compressed ignitability and a high evaporation property is prepared as the first fuel F1. In the multi-fuel internal combustion engine, ordinarily, the first fuel F1 is directly injected into the combustion chamber CC by the first fuel supply means to thereby form a pre-mixture gas of the rich first fuel F1 in the periphery of the ignition plug 71 as well as a lean pre-mixture gas is further formed in the periphery of the rich mixture gas and the rich pre-mixture gas is ignited. More specifically, the multi-fuel internal combustion engine is operated in the premixed spark ignition flame propagation combustion mode by the so-called stratified combustion.

Since the multi-fuel internal combustion engine generates knocking due to an abnormal combustion particularly in a high load region by performing the premixed spark ignition flame propagation combustion, the engine is preferably operated with a high load in the compressed self-ignition diffusive combustion mode in which occurrence of knocking can be suppressed.

However, in the multi-fuel internal combustion engine, since the first fuel F1 directly injected into the combustion chamber CC has the low compressed ignitability, it is difficult to perform the compressed self-ignition diffusive combustion using the first fuel F1. In contrast, the multi-fuel internal combustion engine is provided with the second fuel supply means for injecting the second fuel F2 into the intake air port 11b and introducing the second fuel F2 into the combustion chamber CC.

Thus, the multi-fuel internal combustion engine of the fourth embodiment previously injects the second fuel F2 and improves the ignitability to the first fuel F1 having the low compressed ignitability in the combustion chamber CC based on the same idea as the first embodiment described above so that the multi-fuel internal combustion engine can be operated in the compressed self-ignition diffusive combustion mode even if such the first fuel F1 is used.

For example, in the multi-fuel internal combustion engine of the fourth embodiment, as a basic fuel injection control mode of the multi-fuel internal combustion engine, when the multi-fuel internal combustion engine is operated in the compressed self-ignition diffusive combustion mode, the fuel is introduced into the combustion chamber CC by driving and controlling only the fuel injection valves 257A for in-cylinder direct injection or both the fuel injection valves 257A, 257B. Whereas, when multi-fuel internal combustion engine is operated in the premixed spark ignition flame propagation combustion mode, the fuel is introduced into the combustion chamber CC by driving and controlling only the fuel injection valves 257B for port injection or both the fuel injection valves 257A, 257B. In the multi-fuel internal combustion engine, the fuel injection amounts and the like of the respective fuel injection valves 257A, 257B are controlled so that an optimum fuel mixing ratio of the first fuel F1 and the second fuel F2 is achieved in the combustion chamber CC according to a combustion mode and an operating condition.

Figure 7:
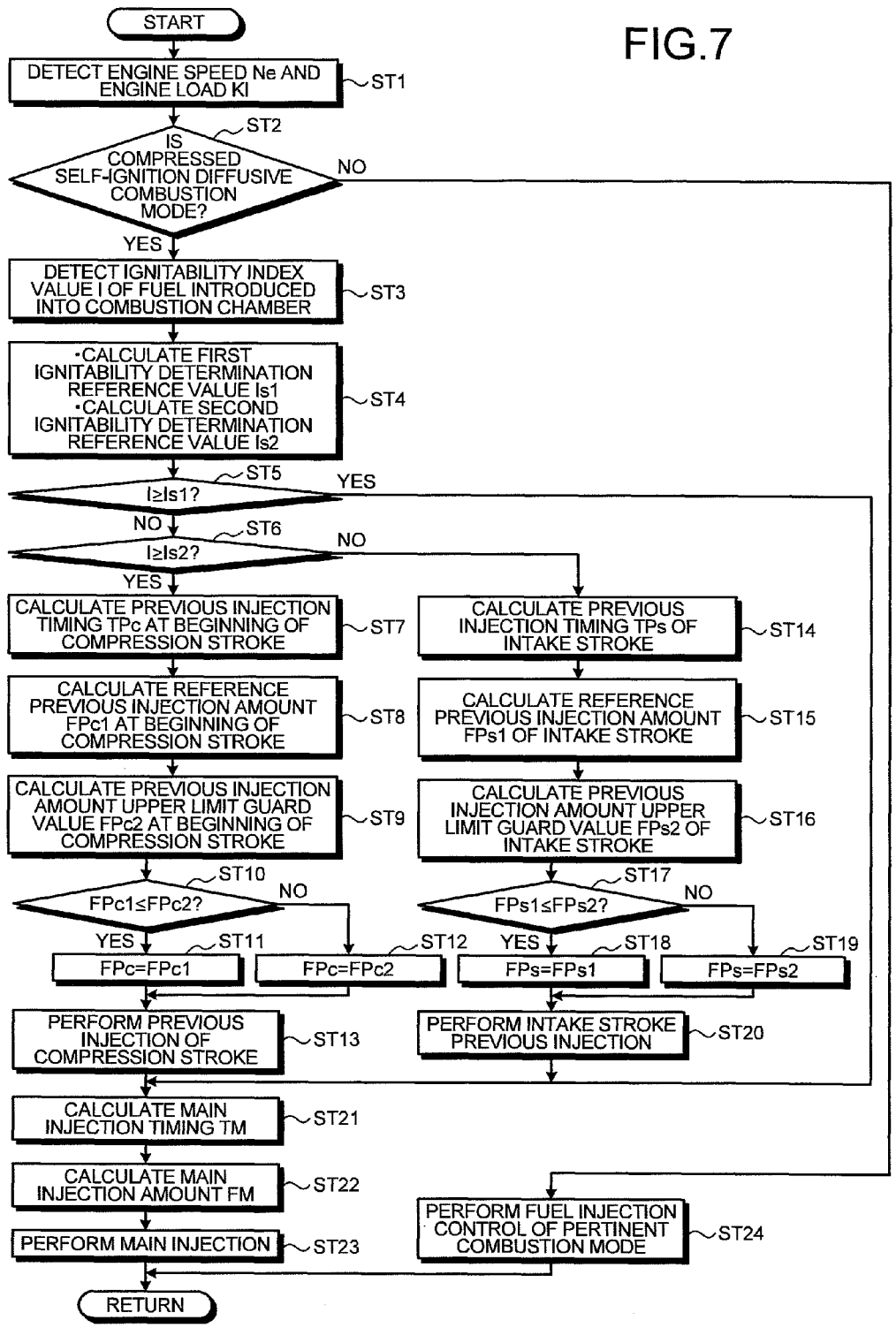
FIG. 7 is a flowchart explaining a combustion injection control operation in the multi-fuel internal combustion engine of the first embodiment.

Also in the case, a fuel injection control of the multi-fuel internal combustion engine of the fourth embodiment is performed by the electronic control unit 1 likewise the flowchart of FIG. 7 of the first embodiment described above. Accordingly, a fuel having a low compressed ignitability such as an alcohol fuel and the like may be used and a fuel having a high compressed ignitability such as diesel oil and the like may be used as the second fuel F2 of the fourth embodiment. Note that, in the fourth embodiment, step ST3 of the flowchart of FIG. 7 is read differently as "Detect ignitability index values IP, IM of previous-injected fuel (second fuel F2) and main-injected fuel (first fuel F1) introduced into combustion chamber". Further, steps ST5, ST6 are read differently as "IM≧Is1?", "IP≧Is2?", respectively.

Accordingly, in the multi-fuel internal combustion engine of the fourth embodiment, a lower compressed ignitability of the second fuel F2 previously injects the second fuel F2 at an earlier stage of the intake stroke and the like and causes the second fuel F2 to be self-ignited in the combustion chamber CC in the compression stroke. Further, in the multi-fuel internal combustion engine, a higher compressed ignitability of the second fuel F2 previously injects the second fuel F2 at the beginning of the compression stroke and the like and causes the second fuel F2 to be self-ignited in the combustion chamber CC. Note that when the second fuel F2 cannot be self-ignited or is extinguished at once even if it is self-ignited because the second fuel F2 has an excessively low compressed ignitability, the previous-injected fuel may be ignited using the ignition plug 71. With the operation, in the multi-fuel internal combustion engine of the fourth embodiment, since the in-cylinder temperature and the in-cylinder pressure are increased until the main injection timing TM is reached and the ignitability to the first fuel F1 having the low compressed ignitability in the combustion chamber CC is improved, an excellent compressed self-ignition diffusive combustion can be performed by main injecting the first fuel F1. Accordingly, the multi-fuel internal combustion engine can achieve the same advantage as that of the first embodiment described above.

Incidentally, also in the multi-fuel internal combustion engine of the fourth embodiment, when the previous-injected fuel (second fuel F2) cannot be self-ignited or is extinguished at once even if it is self-ignited because the previous-injected fuel has an excessive low compressed ignitability as explained in the first embodiment described above, the previous-injected fuel may be ignited using the ignition plug 71. In the case, the previous-injected fuel is preferably a high flammable fuel. Further, also in the multi-fuel internal combustion engine of the fourth embodiment, the ignition of the main-injected fuel (first fuel F1) having the low compressed ignitability may be accelerated using the flame cores and heat generation, which are obtained when the previous-injected fuel is self-ignited or ignited by the ignition plug 71, as a fire lighting source as explained in the first embodiment described above likewise. Further, in the multi-fuel internal combustion engine of the fourth embodiment, the previous-injected fuel (second fuel F2) is injected into the intake air port 11b. However, the fuel injection valves 257B for port injection may be replaced with fuel injection valves for in-cylinder direct injection so that the previous-injected fuel is directly injected into the combustion chamber CC, and the same advantage as that described above can be achieved even by the configuration.

INDUSTRIAL APPLICABILITY

As described above, the multi-fuel internal combustion engines according to the present invention are useful for a technology for improving an ignitability to a fuel having a low compressed ignitability in a combustion chamber, when a multi-fuel internal combustion engine is operated in a compressed self-ignition diffusive combustion mode using a fuel having a low compressed ignitability.

The invention claimed is:

1. A multi-fuel internal combustion engine operated by introducing at least one type of fuel among at least two types of fuels with different properties into a combustion chamber or introducing a mixed fuel composed of at least the two types of fuels into the combustion chamber, the engine comprising:
   a fuel characteristics detection unit that detects an ignitability index value as an index showing a compressed ignitability of a fuel itself introduced into the combustion chamber; and
   a fuel injection control unit that previously injects, when a compressed self-ignition diffusive combustion is performed using a fuel in the combustion chamber, which is determined to have a low compressed ignitability based on the ignitability index value, the fuel at predetermined timing in a period from an intake stroke to a compression stroke, and thereafter mainly injects the fuel and introduces the fuel having the low compressed ignitability into the combustion chamber.

2. The multi-fuel internal combustion engine according to claim 1, wherein when an ignitability to the previous-injected fuel in the combustion chamber is lower, the fuel injection control unit previously injects the fuel at an earlier timing in the period from the intake stroke to the compression stroke.

3. The multi-fuel internal combustion engine according to claim 1, wherein the fuel injection control unit more reduces an amount of the previous-injected fuel as an intake air pressure is lower.

4. The multi-fuel internal combustion engine according to claim 3, wherein the fuel injection control unit more reduces an upper limit value of the amount of the previous-injected fuel as the intake air pressure is lower.

5. The multi-fuel internal combustion engine according to claim 1, wherein the fuel injection control unit more reduces the amount of the previous-injected fuel as an engine speed is lower.

6. The multi-fuel internal combustion engine according to claim 5, wherein the fuel injection control unit more reduces the upper limit value of the amount of the previous-injected fuel as an engine speed is lower.

7. The multi-fuel internal combustion engine according to claim 1, wherein the fuel introduced into the combustion chamber is a mixed fuel of gasoline and diesel oil.

8. The multi-fuel internal combustion engine according to claim 1, wherein the previous-injected fuel is a high flammable fuel, and the fuel injection control unit spark-ignites a mixture gas of the previous-injected fuel and thereafter mainly injects the mixture gas.

9. The multi-fuel internal combustion engine according to claim 1, wherein when the previous injection is performed, the fuel injection control unit advance-angle-controls a fuel injection timing of the main injection.

10. The multi-fuel internal combustion engine according to claim 2, wherein the fuel injection control unit more reduces an amount of the previous-injected fuel as an intake air pressure is lower.

11. The multi-fuel internal combustion engine according to claim 2, wherein the fuel injection control unit more reduces the amount of the previous-injected fuel as an engine speed is lower.

12. The multi-fuel internal combustion engine according to claim 3, wherein the fuel injection control unit more reduces the amount of the previous-injected fuel as an engine speed is lower.

13. The multi-fuel internal combustion engine according to claim 4, wherein the fuel injection control unit more reduces the amount of the previous-injected fuel as an engine speed is lower.

14. The multi-fuel internal combustion engine according to claim 2, wherein the fuel introduced into the combustion chamber is a mixed fuel of gasoline and diesel oil.

15. The multi-fuel internal combustion engine according to claim 3, wherein the fuel introduced into the combustion chamber is a mixed fuel of gasoline and diesel oil.

16. The multi-fuel internal combustion engine according to claim 4, wherein the fuel introduced into the combustion chamber is a mixed fuel of gasoline and diesel oil.

17. The multi-fuel internal combustion engine according to claim 5, wherein the fuel introduced into the combustion chamber is a mixed fuel of gasoline and diesel oil.

18. The multi-fuel internal combustion engine according to claim 6, wherein the fuel introduced into the combustion chamber is a mixed fuel of gasoline and diesel oil.

19. The multi-fuel internal combustion engine according to claim 2, wherein when the previous injection is performed, the fuel injection control unit advance-angle-controls a fuel injection timing of the main injection.

20. The multi-fuel internal combustion engine according to claim 3, wherein when the previous injection is performed, the fuel injection control unit advance-angle-controls a fuel injection timing of the main injection.

* * * * *